US012548157B2

(12) United States Patent
Dodle et al.

(10) Patent No.: US 12,548,157 B2
(45) Date of Patent: Feb. 10, 2026

(54) SYSTEMS AND METHODS FOR INLINE QUALITY CONTROL OF SLIDE DIGITIZATION

(71) Applicant: Pramana, Inc., Cambridge, MA (US)

(72) Inventors: Durgaprasad Dodle, Telangana (IN); Shilpa G. Krishna, Kerala (IN); Priyanka Golchha, Rajasthan (IN); Raghubansh Bahadur Gupta, Bangalore (IN); Jaya Jain, Shahpura (IN); Prasanth Perugupalli, Cary, NC (US); Prateek Jain, Karnataka (IN); Parveen Shaik Gangirevula, Bengaluru (IN); Pavani Pallavi Pelluru, Pocharam (IN)

(73) Assignee: Pramana, Inc., Cambridge, MA (US)

( * ) Notice: Subject to any disclaimer, the term of this patent is extended or adjusted under 35 U.S.C. 154(b) by 0 days.

(21) Appl. No.: 18/602,947

(22) Filed: Mar. 12, 2024

(65) Prior Publication Data
US 2024/0386560 A1    Nov. 21, 2024

Related U.S. Application Data

(60) Provisional application No. 63/466,950, filed on May 16, 2023.

(51) Int. Cl.
*G06T 7/00*    (2017.01)

(52) U.S. Cl.
CPC .. *G06T 7/0014* (2013.01); *G06T 2207/10056* (2013.01); *G06T 2207/20081* (2013.01);
(Continued)

(58) Field of Classification Search
CPC ......... G06T 7/0014; G06T 2207/10056; G06T 2207/20081; G06T 2207/20084; G06T 2207/30024; G06T 2207/30168
See application file for complete search history.

(56) References Cited

U.S. PATENT DOCUMENTS

| | | |
|---|---|---|
| 10,762,630 B2 | 9/2020 | Yaqub et al. |
| 2007/0031056 A1* | 2/2007 | Perz ..................... G02B 21/244 |
| | | 382/128 |

(Continued)

FOREIGN PATENT DOCUMENTS

WO    2021189771 A1    9/2021

OTHER PUBLICATIONS

International Search Report; PCT/US2024/028323; Date: Oct. 25, 2024; By: Authorized Officer Shane Thomas.

*Primary Examiner* — Stephen R Koziol
*Assistant Examiner* — Ashley Hytrek
(74) *Attorney, Agent, or Firm* — Caldwell Intellectual Property Law

(57) ABSTRACT

Described herein is a system for digitizing a slide. A system may include an optical system including at least an optical sensor; and a computing device configured to perform a scan of the slide by capturing at least a first image and capturing at least a second image, wherein performing the scan includes identifying a first scanning parameter; using the optical system, capturing the at least a first image as a function of the first scanning parameter; determining a first quality metric as a function of the at least a first image; determining a second scanning parameter as a function of the first quality metric; and using the optical system, capturing the at least a second image as a function of the second scanning parameter.

24 Claims, 17 Drawing Sheets

(52) U.S. Cl.
CPC ............... *G06T 2207/20084* (2013.01); *G06T 2207/30024* (2013.01); *G06T 2207/30168* (2013.01)

(56) References Cited

U.S. PATENT DOCUMENTS

| | | | |
|---|---|---|---|
| 2011/0249910 A1* | 10/2011 | Henderson | G06V 10/993 382/278 |
| 2012/0275671 A1* | 11/2012 | Eichhorn | H04N 19/60 382/128 |
| 2013/0077892 A1* | 3/2013 | Ikeno | G06T 3/4038 382/286 |
| 2014/0294266 A1* | 10/2014 | Eichhorn | H04N 19/86 382/128 |
| 2014/0354859 A1* | 12/2014 | Noyes | H04N 23/745 348/241 |
| 2020/0355903 A1* | 11/2020 | Bredno | H04N 23/67 |
| 2021/0201536 A1* | 7/2021 | Atchison | G06T 7/90 |
| 2023/0206416 A1 | 6/2023 | Maier et al. | |
| 2023/0377154 A1 | 11/2023 | Cheng et al. | |

\* cited by examiner

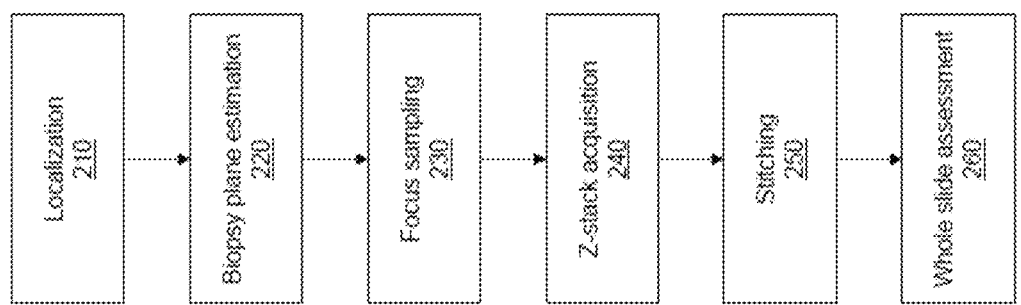

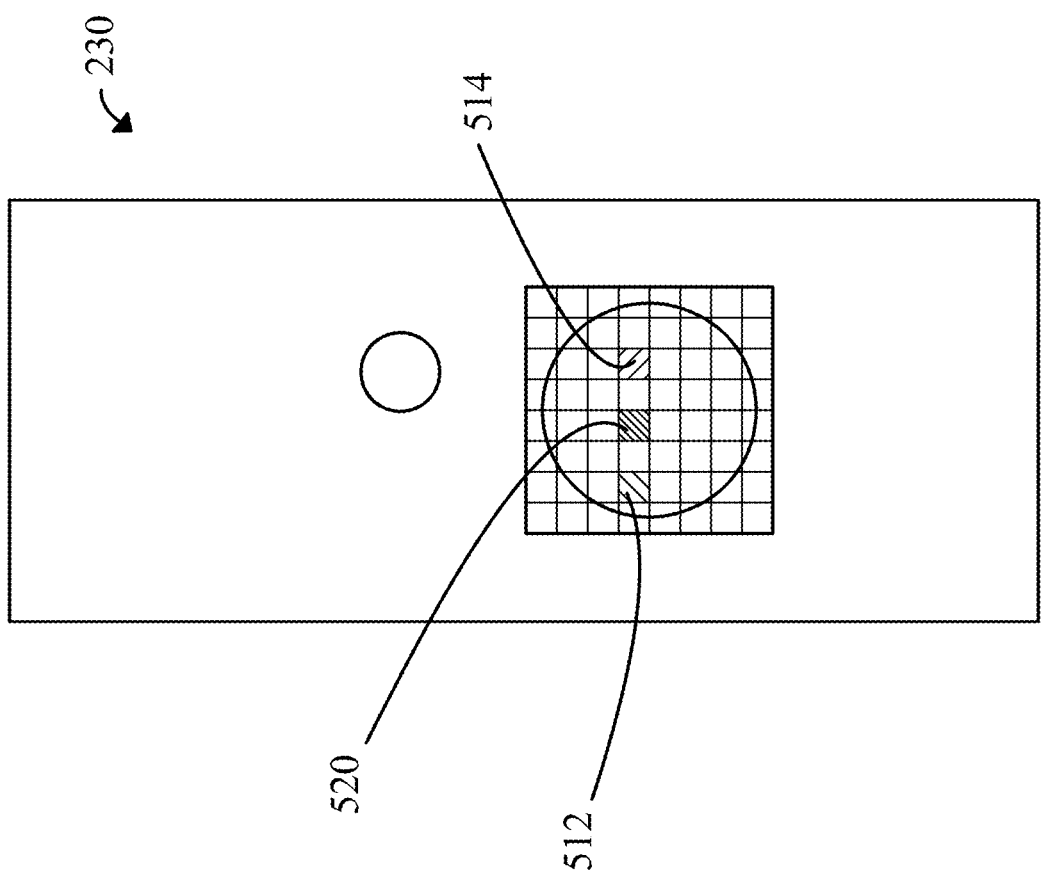

SYSTEMS AND METHODS FOR INLINE QUALITY CONTROL OF SLIDE DIGITIZATION

CROSS-REFERENCE TO RELATED APPLICATIONS

This application claims the benefit of priority of U.S. Provisional Patent Application Ser. No. 63/466,950, filed on May 16, 2023, and titled "SYSTEMS AND METHODS FOR INLINE QUALITY CONTROL OF SLIDE DIGITIZATION," which is incorporated by reference herein in its entirety.

FIELD OF THE INVENTION

The present invention generally relates to the field of slide digitization. In particular, the present invention is directed to techniques for inline quality control of slide digitization.

BACKGROUND

Examination of slides containing biomedical specimens, such as tissue samples, under a microscope provides data that can be exploited for a variety of biomedical applications. For example, physicians or other qualified individuals may be able to diagnose pathological conditions or detect microbial organisms. In many instances, the physician may observe the slides directly under the microscope. Increasingly, however, it is desirable to digitize microscope slides for downstream analysis.

SUMMARY OF THE DISCLOSURE

In an aspect, a system for digitizing a slide may include an optical system comprising at least an optical sensor; and a computing device configured to perform a scan of the slide by capturing at least a first image and capturing at least a second image, wherein performing the scan includes identifying a first scanning parameter; using the optical system, capturing the at least a first image as a function of the first scanning parameter; determining a first quality metric as a function of the at least a first image; determining a second scanning parameter as a function of the first quality metric; and using the optical system, capturing the at least a second image as a function of the second scanning parameter.

In another aspect, a method of digitizing a slide may include, using at least a processor, performing a scan of the slide by capturing at least a first image and capturing at least a second image, wherein performing the scan includes identifying a first scanning parameter; using an optical system, capturing the at least a first image as a function of the first scanning parameter; determining a first quality metric as a function of the at least a first image; determining a second scanning parameter as a function of the first quality metric; and using the optical system, capturing the at least a second image as a function of the second scanning parameter.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 2 is a flow diagram of an exemplary embodiment of a data flow for inline quality control;

FIG. 5 is a diagram of an exemplary embodiment of a focus sampling module of a data flow for inline quality control;

Figure 1:
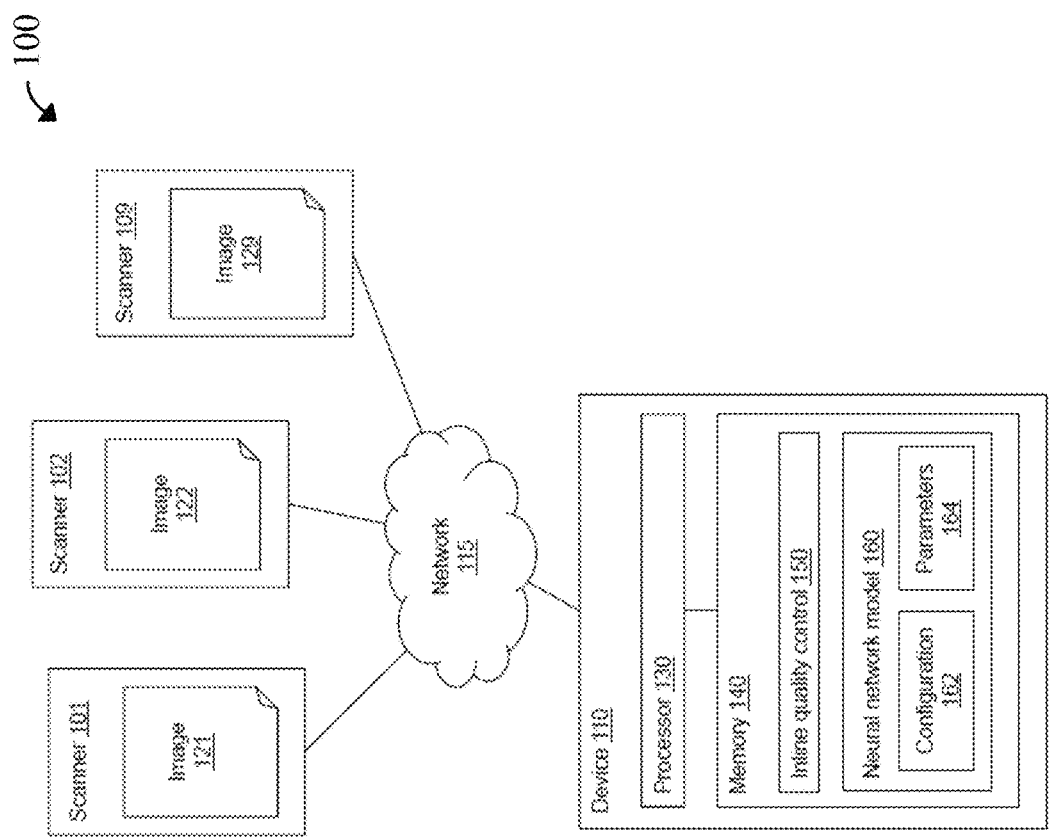
FIG. 1 is a schematic diagram of an exemplary embodiment of a system for inline quality control of slide digitization.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Over the last several years, an increasing amount of clinical patient data has become digitized, and progress has been made in building systems that process clinical patient data in an electronic format. For example, cloud-based systems can collect digitized health records from across institutions (e.g., hospitals, clinics, etc.) and can analyze patient data at a scale that was not attainable until recently. For example, de-identification of electronic health records has opened up the possibility of learning from de-identified data within and across medical institutions/facilities that are owners of the de-identified data. Variations of federated learning approaches are now being used to facilitate such learning within and across data repositories.

As the amount of data and processing scale increases, there is an emerging need for techniques that can automate the process of acquiring clinically relevant digital data. Digitized slides, such as whole slide images (WSIs), are one such type of digital data. Clinical and research institutions use slides containing biomedical specimens (e.g., tissue samples) for a wide range of applications such as disease diagnosis. The ability to digitize slides at scale may facilitate a variety of downstream applications such as training machine learning models and performing large-scale data analysis.

However, this approach to slide digitization may be manually intensive, involving intervention by a clinician at various steps of the digitization process. Moreover, this approach may be error-prone or inefficient. For example, as further explained below, portions of the output image may be out of focus and may contain unwanted artifacts, such as ghosting and banding. As another example, the specimen of interest may be missing from the portion of the slide that is scanned.

To prevent such digitization errors from interfering with downstream applications, it may be possible to perform a post-imaging quality check to determine whether a slide image meets a given acceptance criteria. However, post-imaging quality checks offer limited remedial options. For example, one remedial option may be to remove an image of a slide that does not meet the acceptance criteria from the data set, but this undesirably results in a smaller set of data for downstream applications, and the resources that were used to prepare and scan the slide would be wasted. Another remedial option may be to rescan a slide that does not meet the acceptance criteria, but this approach may be inefficient—e.g., this approach may involve rescanning an entire slide even when the error impacts a portion of the slide, the slide may have already been physically removed from the scanner or placed into storage, or the like. These inefficiencies may result in wasted resources, delayed diagnoses, increased manual intervention in the digitization process, low throughput, or the like. For example, a given slide may undergo multiple passes through the scanner before an image that passes the quality checks is produced, resulting in additional time consumption to set up and wind down each pass through the scanner. Ultimately, digitization errors may have the effect of significantly reducing the scanning throughput and thereby limiting the scalability of the slide digitization process.

Therefore, an opportunity exists for slide digitization with inline quality controls—e.g., quality controls that are performed concurrently with the steps of the slide digitization process and/or prior to removing the slide from the scanner. Inline quality controls may facilitate increased automation, quality, and throughput in the slide digitization process while mitigating the downsides associated with inadequate quality control, e.g., the post-imaging quality control described above. For example, inline quality controls may facilitate throughput-enhancing remedial options, such as rescanning selected portions of a slide determined to be defective (rather than an entire slide) and initiating rescans prior to a slide being removed from the scanner. Illustratively, inline quality controls may enable scanning a slide, performing quality checks, and rescanning areas identified as defective in a single pass through the scanner, which in turn increases the throughput of high-quality scanned images. In some embodiments, a system and/or method described herein may be used for high volume scanning.

FIG. 1 is a simplified diagram of a system 100 for inline quality control of slide digitization according to some embodiments. System 100 may include a processor. Processor may include, without limitation, any processor described in this disclosure. Processor may be included in a computing device. System 100 may include at least a processor and a memory communicatively connected to the at least a processor, the memory containing instructions configuring the at least a processor to perform one or more processes described herein. Computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented, as a non-limiting example, using a "shared nothing" architecture.

Still referring to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, as used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, in some embodiments, system 100 may be used to generate an image of slide and/or a sample on slide. As used herein, a "slide" is a container or surface holding a sample of interest. In some embodiments, slide may include a glass slide. In some embodiments, slide may include a formalin fixed paraffin embedded slide. In some embodiments, a sample on slide may be stained. In some embodiments, slide may be substantially transparent. In some embodiments, slide may include a thin, flat, and substantially transparent glass slide. In some embodiments, a transparent cover may be applied to slide such that a sample is between slide and this cover. A sample may include, in non-limiting examples, a blood smear, pap smear, body fluids, and non-biologic samples. In some embodiments, a sample on slide may include tissue. In some embodiments, sample on slide may be frozen.

Still referring to FIG. 1, in some embodiments, slide and/or a sample on slide may be illuminated. In some embodiments, system 100 may include a light source. As used herein, a "light source" is any device configured to emit electromagnetic radiation. In some embodiments, light source may emit a light having substantially one wavelength. In some embodiments, light source may emit a light having a wavelength range. Light source may emit, without limitation, ultraviolet light, visible light, and/or infrared light. In non-limiting examples, light source may include a light-emitting diode (LED), an organic LED (OLED) and/or any other light emitter. Such a light source may be configured to illuminate slide and/or sample on slide. In a non-limiting example, light source may illuminate slide and/or sample on slide from below.

Still referring to FIG. 1, in some embodiments, system 100 may include at least an optical system. As used in this disclosure, an "optical system" is an arrangement of one or more components which together act upon or employ electromagnetic radiation. In non-limiting examples, electromagnetic radiation may include light, such as visible light, infrared light, UV light, and the like. An optical system may include one or more optical elements, including without limitation lenses, mirrors, windows, filters, and the like. An optical system may form an optical image that corresponds to an optical object. For instance, an optical system may form an optical image at or upon an optical sensor, which can capture, e.g., digitize, the optical image. In some cases, optical system may have at least a magnification. For instance, optical system may include an objective (e.g., microscope objective) and one or more reimaging optical elements that together produce an optical magnification. In some cases, optical magnification may be referred to herein as zoom. As used herein, an "optical sensor" is a device that measures light and converts the measured light into one or more signals; one or more signals may include, without limitation, one or more electrical signals. In some embodiments, optical sensor may include at least a photodetector. As used herein, a "photodetector" is a device that is sensitive to light and thereby able to detect light. In some embodiments, a photodetector may include a photodiode, a photoresistor, a photosensor, a photovoltaic chip, and the like. In some embodiments, optical sensor may include a plurality of photodetectors. Optical sensor may include, without limitation, a camera. Optical sensor may be in electronic communication with at least a processor of system 100. As used herein, "electronic communication" as used in this disclosure is a shared data connection between two or more devices. In some embodiments, system 100 may include two or more optical sensors. In some embodiments, a scanner may include at least an optical system. For example, scanner 101, scanner 102, and/or scanner 109 may include at least an optical system.

Still referring to FIG. 1, in some embodiments, optical system may include a camera. In some cases, a camera may include one or more optics. Exemplary non-limiting optics include spherical lenses, aspherical lenses, reflectors, polarizers, filters, windows, aperture stops, and the like. In some embodiments, one or more optics associated with a camera may be adjusted in order to, in non-limiting examples, change the zoom, depth of field, and/or focus distance of the camera. In some embodiments, one or more of such settings may be configured to detect a feature of a sample on slide. In some embodiments, one or more of such settings may be configured based on a scanning parameter, as described herein. In some embodiments, camera may capture images at a low depth of field. In a non-limiting example, camera may capture images such that a first depth of sample is in focus and a second depth of sample is out of focus. In some embodiments, an autofocus mechanism may be used to determine focus distance. In some embodiments, focus distance may be set by parameter set. In some embodiments, camera may be configured to capture a plurality of images at different focus distances. In a non-limiting example, camera may capture a plurality of images at different focus distances, such that images are captured where each focus depth of the sample is in focus in at least one image. In some embodiments, at least a camera may include an image sensor. Exemplary non-limiting image sensors include digital image sensors, such as without limitation charge-coupled device (CCD) sensors and complimentary metal-oxide-semiconductor (CMOS) sensors. In some embodiments, a camera may be sensitive within a non-visible range of electromagnetic radiation, such as without limitation infrared.

Still referring to FIG. 1, as used herein, "image data" is information representing at least a physical scene, space, and/or object. Image data may include, for example, information representing a sample, slide, or region of a sample or slide. In some cases, image data may be generated by a camera. "Image data" may be used interchangeably through this disclosure with "image," where image is used as a noun. An image may be optical, such as without limitation where at least an optic is used to generate an image of an object. An image may be digital, such as without limitation when represented as a bitmap. Alternatively, an image may include any media capable of representing a physical scene, space, and/or object. Alternatively, where "image" is used as a verb, in this disclosure, it refers to generation and/or formation of an image.

Still referring to FIG. 1, in some embodiments, system 100 may include a slide port. In some embodiments, slide port may be configured to hold slide. In some embodiments, slide port may include one or more alignment features. As used herein, an "alignment feature" is a physical feature that helps to secure a slide in place and/or align a slide with another component of an apparatus. In some embodiments, alignment feature may include a component which keeps slide secure, such as a clamp, latch, clip, recessed area, or another fastener. In some embodiments, slide port may allow for easy removal or insertion of slide. In some embodiments, slide port may include a transparent surface through which light may travel. In some embodiments, slide may rest on and/or may be illuminated by light traveling through such a transparent surface. In some embodiments, slide port may be mechanically connected to an actuator mechanism as described below. In some embodiments, a scanner may include a slide port. For example, scanner 101, scanner 102, and/or scanner 109 may include a slide port.

Still referring to FIG. 1, in some embodiments, system 100 may include an actuator mechanism. As used herein, an "actuator mechanism" is a mechanical component configured to change the relative position of a slide and an optical system. In some embodiments, actuator mechanism may be mechanically connected to slide, such as slide in slide port. In some embodiments, actuator mechanism may be mechanically connected to slide port. For example, actuator mechanism may move slide port in order to move slide. In some embodiments, actuator mechanism may be mechanically connected to at least an optical system. In some embodiments, actuator mechanism may be mechanically connected to a mobile element. A mobile element may include a movable or portable object, component, and/or device within system 100 such as, without limitation, a slide, a slide port, or an optical system. In some embodiments, a mobile element may move such that optical system is positioned correctly with respect to slide such that optical system may capture an image of slide according to a scanning parameter. In some embodiments, actuator mechanism may be mechanically connected to an item selected from the list consisting of slide port, slide, and at least an optical system. In some embodiments, actuator mechanism may be configured to change the relative position of slide and optical system by moving slide port, slide, and/or optical system. In some embodiments, a scanner may include an actuator mechanism. For example, scanner 101, scanner 102, and/or scanner 109 may include an actuator mechanism.

Still referring to FIG. 1, actuator mechanism may include a component of a machine that is responsible for moving and/or controlling a mechanism or system. Actuator mechanism may, in some embodiments, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or even human power. In some cases, an actuator may have an energy or power source other than control signal. This may include a main energy source, which may include for example electric power, hydraulic power, pneumatic power, mechanical power, and the like. In some embodiments, upon receiving a control signal, actuator mechanism responds by converting source power into mechanical motion. In some cases, actuator mechanism may be understood as a form of automation or automatic control.

Still referring to FIG. 1, in some embodiments, actuator mechanism may include a hydraulic actuator. A hydraulic actuator may consist of a cylinder or fluid motor that uses hydraulic power to facilitate mechanical operation. Output of hydraulic actuator mechanism may include mechanical motion, such as without limitation linear, rotatory, or oscillatory motion. In some embodiments, hydraulic actuator may employ a liquid hydraulic fluid. As liquids, in some cases, are incompressible, a hydraulic actuator can exert large forces. Additionally, as force is equal to pressure multiplied by area, hydraulic actuators may act as force transformers with changes in area (e.g., cross sectional area of cylinder and/or piston). An exemplary hydraulic cylinder may consist of a hollow cylindrical tube within which a piston can slide. In some cases, a hydraulic cylinder may be considered single acting. Single acting may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. Double acting may be used when pressure is applied substantially on each side of a piston; any difference in resultant force between the two sides of the piston causes the piston to move.

Still referring to FIG. 1, in some embodiments, actuator mechanism may include a pneumatic actuator mechanism. In some cases, a pneumatic actuator may enable considerable forces to be produced from relatively small changes in gas pressure. In some cases, a pneumatic actuator may respond more quickly than other types of actuators, for example hydraulic actuators. A pneumatic actuator may use compressible fluid (e.g., air). In some cases, a pneumatic actuator may operate on compressed air. Operation of hydraulic and/or pneumatic actuators may include control of one or more valves, circuits, fluid pumps, and/or fluid manifolds.

Still referring to FIG. 1, in some cases, actuator mechanism may include an electric actuator. Electric actuator mechanism may include any of electromechanical actuators, linear motors, and the like. In some cases, actuator mechanism may include an electromechanical actuator. An electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential. Electric actuator mechanism may include a linear motor. Linear motors may differ from electromechanical actuators, as power from linear motors is output directly as translational motion, rather than output as rotational motion and converted to translational motion. In some cases, a linear motor may cause lower friction losses than other devices. Linear motors may be further specified into at least 3 different categories, including flat linear motor, U-channel linear motors and tubular linear motors. Linear motors may be directly controlled by a control signal for controlling one or more linear motor parameters. Exemplary linear motor parameters include without limitation position, force, velocity, potential, and current.

Still referring to FIG. 1, in some embodiments, an actuator mechanism may include a mechanical actuator mechanism. In some cases, a mechanical actuator mechanism may function to execute movement by converting one kind of motion, such as rotary motion, into another kind, such as linear motion. An exemplary mechanical actuator includes a rack and pinion. In some cases, a mechanical power source, such as a power take off may serve as power source for a mechanical actuator. Mechanical actuators may employ any number of mechanisms, including for example without limitation gears, rails, pulleys, cables, linkages, and the like.

Still referring to FIG. 1, in some embodiments, actuator mechanism may be in electronic communication with actuator controls. As used herein, "actuator controls" is a system configured to operate actuator mechanism such that a slide and an optical system reach a desired relative position. In some embodiments, actuator controls may operate actuator mechanism based on input received from a user interface. In some embodiments, actuator controls may be configured to operate actuator mechanism such that optical system is in a position to capture an image of an entire sample. In some embodiments, actuator controls may be configured to operate actuator mechanism such that optical system is in a position to capture an image using settings of a particular scanning parameter. In some embodiments, actuator controls may be configured to operate actuator mechanism such that optical system is in a position to capture an image of a region of interest, a particular horizontal row, a particular point, a particular focus depth, and the like. Electronic communication between actuator mechanism and actuator controls may include transmission of signals. For example, actuator controls may generate physical movements of actuator mechanism in response to an input signal. In some embodiments, input signal may be received by actuator controls from processor or input interface.

Still referring to FIG. 1, in some embodiments, system 100 may include a user interface. User interface may include output interface and input interface. In some embodiments, output interface may include one or more elements through which system 100 may communicate information to a user. In a non-limiting example, output interface may include a display. A display may include a high resolution display. A display may output images, videos, and the like to a user. In another non-limiting example, output interface may include a speaker. A speaker may output audio to a user. In another non-limiting example, output interface may include a haptic device. A haptic device may output haptic feedback to a user.

Still referring to FIG. 1, in some embodiments, input interface may include controls for operating system 100. Such controls may be operated by a user. Input interface may include, in non-limiting examples, a camera, microphone, keyboard, touch screen, mouse, joystick, foot pedal, button, dial, and the like. Input interface may accept, in non-limiting examples, mechanical input, audio input, visual input, text input, and the like. In some embodiments, input interface may approximate controls of a microscope.

Still referring to FIG. 1, system 100 may perform inline quality control of slide digitization. In a non-limiting embodiment, system 100 may include one or more scanners 101-109 that are communicatively coupled to a device 110. Scanners 101-109 generally include devices or systems used to digitize slides containing biomedical specimens (e.g., tissue samples), such as digital cameras, digital microscopes, digital pathology scanners, or the like. Device 110 generally includes a computing device or system, such as personal computer, an on-premises server, a cloud-based server, or the like. In some embodiments, device 110 may be directly connected to and/or integrated within one or more of scanners 101-109. Additionally, or alternately, scanners 101-109 may be communicatively coupled to device 110 via a network 115. Network 115 can include one or more local area networks (LANs), wide area networks (WANs), wired networks, wireless networks, the Internet, or the like. Illustratively, scanners 101-109 may communicate with device 110 over network 115 using the TCP/IP protocol or other suitable networking protocols. During operation, scanners 101-109 capture digital images 121-129 of the slides and send them to device 110, e.g., via network 115. For efficient storage and/or transmission, images 121-129 may be compressed prior to or during transmission. Security measures such as encryption, authentication (including multi-factor authentication), SSL, HTTPS, and other security techniques may also be applied.

Still referring to FIG. 1, in some embodiments, device 110 may be configured to control the operation of scanners 101-109 to automate the slide digitization process. For example, device 110 may send instructions to scanners 101-109 to scan or rescan selected portions of a slide (e.g., areas identified by x-, y-, and/or z-coordinates or bounding boxes). Device 110 may further select parameters associated with scanners 101-109, such as magnification level, focus settings, scanning pattern, or the like.

Still referring to FIG. 1, as discussed above, automating the slide digitization process using device 110 may present challenges. For example, one or more of images 121-129 may be out of focus or may capture a different portion of the slide than intended, e.g., the actual coordinates of the image may be offset from the intended coordinates. In embodiments where a series of images of a given slide are captured (e.g., when the slide is scanned using a grid scanning pattern), the process of stitching the images together to generate an aggregated image of the slide may introduce artifacts, such as ghosting or banding. These defects may interfere with downstream applications that receive the digitized slide images output by device 110. For example, the defects may result in a reduction in performance of a machine learning model trained using the digitized slides due to the reduced size and/or quality of the training data set. Moreover, the defects may be identified too late to efficiently take remedial action, e.g., a defective image may be removed from the data set (resulting in wasted resources that went into scanning the image), or the slide may be placed back into the scanner for another scanning pass (resulting in additional setup and takedown time). Such remedial actions may involve manual intervention, such that the level of automation in the slide digitization process is reduced.

Still referring to FIG. 1, therefore, according to some embodiments, device 110 includes an inline quality control program 150, which may address one or more of the challenges identified above. Namely, as depicted in FIG. 1, device 110 includes a processor 130 (e.g., one or more hardware processors) coupled to a memory 140 (e.g., one or more non-transitory memories). Memory 140 stores instructions and/or data corresponding to inline quality control program 150. When executed by processor 130, inline quality control program 150 causes processor 130 to perform operations associated with inline quality control of slide digitization based on images 121-129. Illustrative embodiments of data flows implemented by inline quality control program 150 are described in further detail below with reference to FIG. 2.

Still referring to FIG. 1, during execution of inline quality control program 150, processor 130 may execute one or more neural network models, such as neural network model 160. Neural network model 160 is trained to make predictions (e.g., inferences) based on input data. Neural network model 160 includes a configuration 162, which defines a plurality of layers of neural network model 160 and the relationships among the layers. Illustrative examples of layers include input layers, output layers, convolutional layers, densely connected layers, merge layers, and the like. In some embodiments, neural network model 160 may be configured as a deep neural network with at least one hidden layer between the input and output layers. Connections between layers can include feed-forward connections or recurrent connections.

Still referring to FIG. 1, one or more layers of neural network model 160 is associated with trained model parameters 164. The trained model parameters 164 include a set of parameters (e.g., weight and bias parameters of artificial neurons) that are learned according to a machine learning process. During the machine learning process, labeled training data is provided as an input to neural network model 160, and the values of trained model parameters 164 are iteratively adjusted until the predictions generated by neural network model 160 match the corresponding labels with a desired level of accuracy.

Still referring to FIG. 1, for improved performance, processor 130 may execute neural network model 160 using a graphical processing unit, a tensor processing unit, an application-specific integrated circuit, or the like.

FIGS. 2-7B are simplified diagrams of a data flow 200 for inline quality control according to some embodiments. FIG. 2 provides an overview of data flow 200, and FIGS. 3-7B illustrate certain modules of data flow 200 in greater detail. In some embodiments consistent with FIG. 1, data flow 200 may be implemented using inline quality control program 150 in conjunction with other components and/or features of system 100, as further described below.

Referring now to FIG. 2, in general, data flow 200 includes a set of modules 210-260 (described in further detail below) that correspond to steps in the slide digitization process. Within each module, inline quality control methods are in place to trap errors that can be fixed at that stage below an acceptable threshold for downstream processing. Additionally, or alternately, the inline quality control methods associated with each module may accumulate deviations of observed features from acceptable thresholds and pass the deviations to the next module. In this sense, data flow 200 conceptually resembles a directed computation graph with directed edges leading back to the beginning with information to perform a second pass selectively to fix errors. Most nodes in the graph have automatically determined quality acceptance tests baked in, with tuned thresholds that determine if the processed image proceeds to the next stage or is fed back to the beginning to correct for specific errors detected. For images that are finally output, the errors are within acceptable thresholds. Additionally, the errors that are present in those slides are demarcated for downstream algorithms to avoid or fix. For instance, generative models like diffusion models can leverage these delineated regions to perform inpainting which is then used for downstream tasks.

Still referring to FIG. 2, in some embodiments, system 100 performs a scan of a slide. System 100 may perform a scan of a slide by capturing at least a first image and capturing at least a second image. Performing a scan may include identifying a first scanning parameter. As used herein, a "scanning parameter" is a setting at which a device captures an image. In non-limiting examples, a scanning parameter may include a focal depth, a (x,y) position, a magnification level, an aperture, a shutter speed, an ISO sensitivity, and a level of backlighting. In some embodiments, a first scanning parameter may include which of a plurality of optical sensors to use to capture an image. For example, first scanning parameter may configure a device to capture a macro image of a whole slide and/or an entirety of a sample on a slide. As used herein, a "macro image" is an image in which entirety of a sample on a slide is in frame. In another example, at least a first image includes an image of a region of a sample. Such a macro image may be a wider angle image than subsequently captured images. Such a macro image may include a lower resolution image than a subsequently captured image. Such a macro image may be used to determine subsequent scanning parameters, as described herein. In some embodiments, a macro image may be captured at 1× magnification. In some embodiments, a macro image may be captured using a 5 megapixel camera.

Still referring to FIG. 2, in some embodiments, performing a scan of a slide may include, using an optical system, capturing at least a first image as a function of a first scanning parameter. In some embodiments, at least a first image may be captured at a first position as a function of first scanning parameter. In some embodiments, capturing at least a first image of a slide may include using actuator mechanism and/or actuator controls to move optical system and/or slide into desired positions.

Still referring to FIG. 2, in some embodiments, system 100 may determine a first quality metric as a function of at least a first image. As used herein, a "quality metric" is a datum describing an assessment of a quality of an image, a quality of a section of an image, a quality of a feature of an image, or a combination thereof. In a non-limiting example, a quality metric may describe a degree to which an image and/or a section of an image is in focus. Non-limiting examples of quality metrics include localization quality metric, focus sampling quality metric, biopsy plane estimation quality metric, z-stack acquisition quality metric, and stitching quality metric, each of which is described further herein.

Still referring to FIG. 2, in some embodiments, system 100 may determine a second scanning parameter as a function of first quality metric. System 100 may, using an optical system, capture at least a second image as a function of second scanning parameter. Examples of quality metrics, and their associated scanning parameters are described further below. In some embodiments, at least a second image may be made up of a plurality of high resolution images. Such high resolution images may be stitched together to construct at least a second image which covers a desired area, such as an entire sample or region of interest. In some embodiments, at least a first image may be captured at a first location, and at least a second image may be captured at a second location. For example, a first location may be determined as a function of first scanning parameter, and may include a default location, a location input by a user, or the like. As an example, a second location may be determined as a function of a localization module as described further herein.

Still referring to FIG. 2, in some embodiments, system 100 may determine multiple quality metrics. For example, system 100 may determine localization quality metric, focus sampling quality metric, biopsy plane estimation quality metric, z-stack acquisition quality metric, and stitching quality metric simultaneously. In some embodiments, system 100 may determine one or more scanning parameters and/or capture one or more images based on such quality metrics. For example, system 100 may first determine localization quality metric, then may determine a scanning parameter and may capture a subsequent image using such scanning parameter. System 100 may then determine focus sampling quality metric, may determine a subsequent scanning parameter, and may capture a subsequent image using such scanning parameter.

Figure 3A:
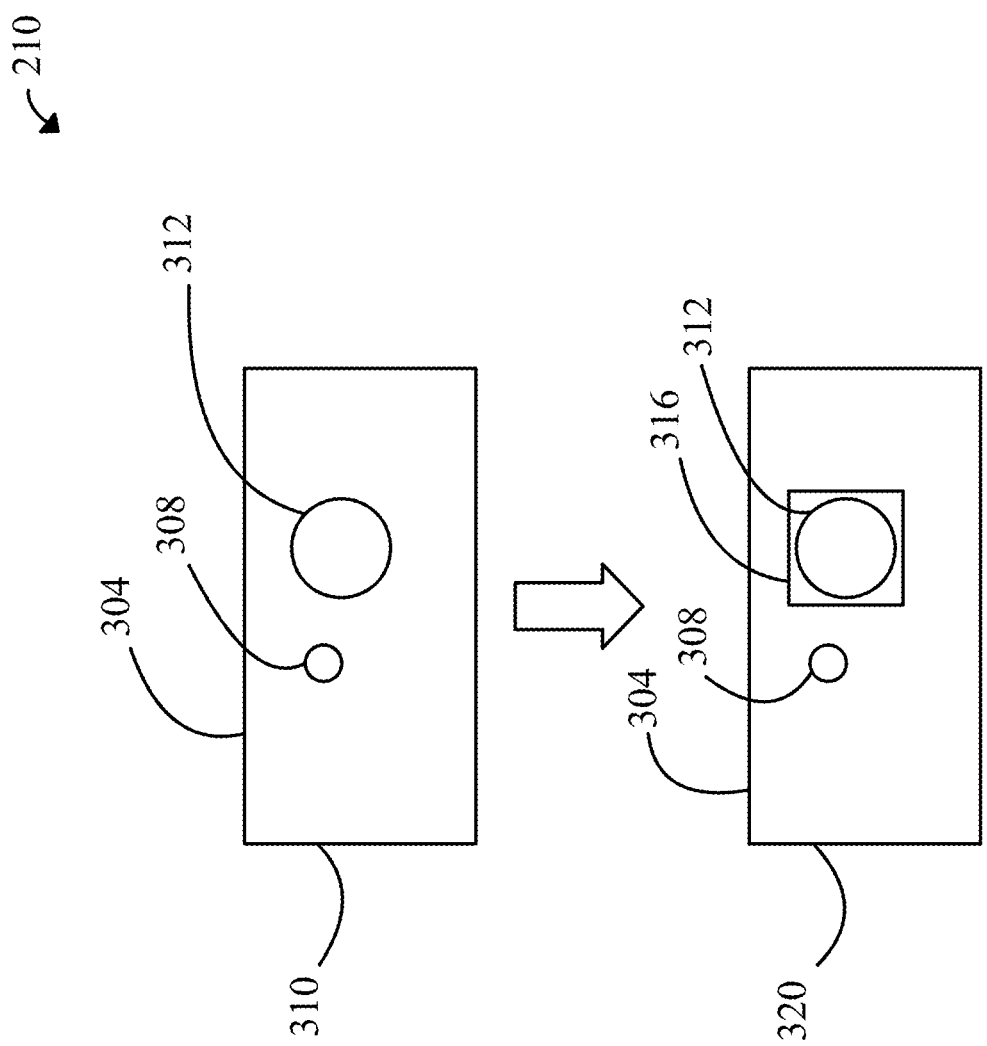
FIGS. 3A-3B are diagrams of an exemplary embodiment of a localization module of a data flow for inline quality control.
Figure 3B:
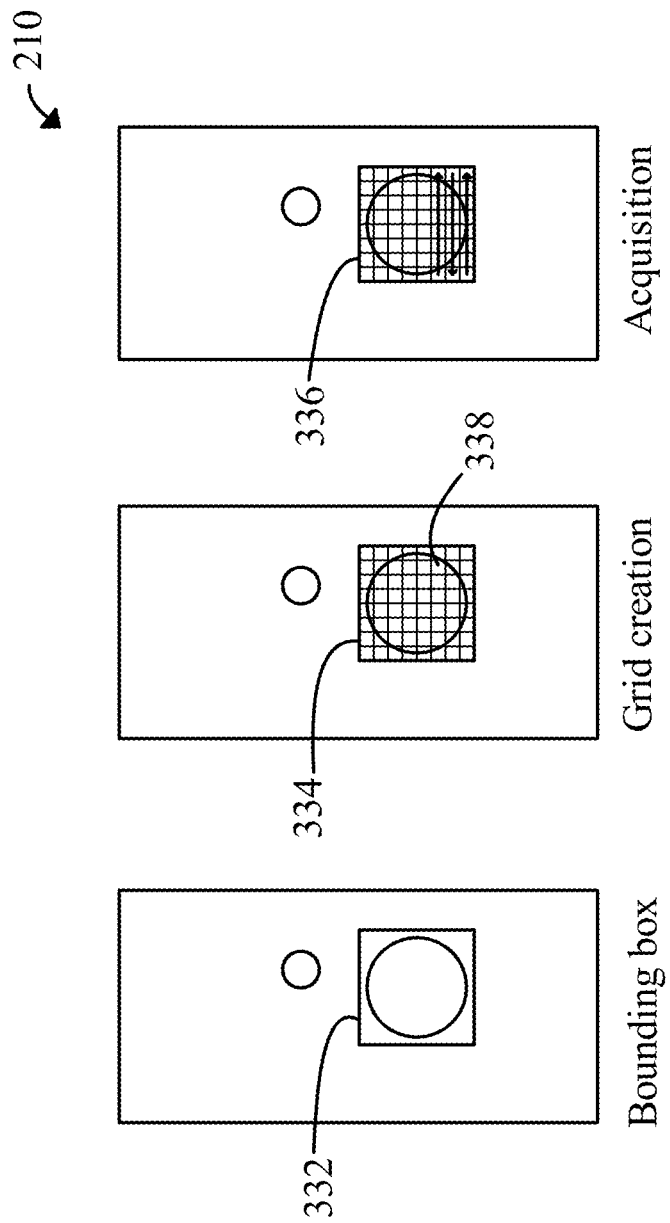

Referring now to FIGS. 2 and 3A-3B, first quality metric may include a localization quality metric; and determining second scanning parameter may include identifying at least a region of interest of slide 304. As used herein, a "region of interest" is a specific area within a slide, or a digital image of a slide, in which a feature is detected. A feature may include, in non-limiting examples, debris 308 sample 312, writing on a slide, a crack in a slide, a bubble, and the like. In some embodiments, a feature includes a sample, such as a biological sample. As used herein, a "localization quality metric" is a quality metric which assesses the performance of a localization module. In some embodiments, localization quality metric may include one or more composite measures used to evaluate the precision and reliability of localization module's ability to detect and position the sample within an image. In other embodiments, localization quality metric may include one or more quantifiable measures utilized by localization module within the system designed to identify region of interest 316. As shown in FIGS. 2 and 3A-3B, data flow 200 includes a localization module 210. As used herein, a "localization module" is an automatic system for identifying a region of interest. Localization module 210 receives an image 310 of slide 304 (shown in FIG. 3A), such as one of images 121-129. In some embodiments, image 310 may be captured at a low magnification level (e.g., 1×) and the field of view may cover a substantial portion of slide 304 (e.g., the image may include most of slide 304, including regions containing the biomedical specimens).

Still referring to FIGS. 2 and 3A-3B, based on image 310, localization module 210 localizes regions of interest 316 on slide 304. For example, as illustrated by image 320, localization module 210 may identify portions of slide 304 that contain biomedical specimens and other slide attributes including but not limited to the color intensity of stained tissue (e.g., dark or faint), the size, shape, and position of the specimen, debris, cover slip boundaries, annotations (e.g., handwritten text, printed text, scanning codes, arrows and markings, or the like), or the like. Localizing regions of interest 316 on slide 304 may be performed by a variety of suitable image processing techniques, including techniques that use machine learning models trained to identify the selected regions of interest. Annotations may be identified using, for example, an optical character recognition (OCR) system.

Still referring to FIGS. 2 and 3A-3B, based on the identified areas of interest, localization module 210 may select one or more portions of the slide to be scanned at a higher magnification level (e.g., 10×, 20×, or 40× magnification). For example, localization module 210 may identify one or more bounding boxes 332 that represent the portions of the slide to be scanned at the higher magnification level, e.g., portions containing the biomedical specimen. Localization module 210 may then form a grid 334 (or other suitable pattern) for each bounding box 332 that identifies the x, y, and/or z coordinates of the desired images to be captured at the higher resolution. In addition, localization module 210 may identify a scanning pattern 336 (e.g., a raster scanning pattern having a primary scanning direction and a secondary scanning direction) that specifies a particular sequence in which the desired images are to be acquired. In some embodiments, localization module 210 may identify one or more features during localization. Such features may include, in non-limiting examples, samples, bubbles, debris, and annotations. In some embodiments, localization module 210 may determine a localization module confidence score. As used herein, a "localization module confidence score" is a data structure describing a likelihood that a feature of a particular category is present in a particular location, region, or both. For example, a first localization module confidence score may be determined with respect to a particular region of a slide, where the first localization module confidence score describes the likelihood that the region contains an annotation. In this example, a second localization module confidence score may be determined with respect to a particular region of a slide, where the second localization module confidence score describes the likelihood that the region contains a biological sample. In some embodiments, localization module 210 may identify a region of interest as a function of one or more localization module confidence scores. For example, localization module 210 may identify a region of interest as a function of a localization module confidence score describing the likelihood that a biological sample is present. In some embodiments, high magnification probing may be used to determine whether a feature, such as a biological sample, is present. For example, high magnification images may be captured of a plurality of regions of a slide, and such high magnification images may be analyzed to determine whether a feature (such as a biological sample) is present. In some embodiments, high magnification probing may be used to determine a region of interest which does not include a region with a low probability of containing a feature such as a biological sample.

Still referring to FIGS. 2 and 3A-3B, in some embodiments, localization module 210 may select one or more reference points 338 within grid 334 for further imaging and analysis, such as biopsy plane estimation or focus sampling, as further described below. As used herein, a "reference point" is a point within a grid whose focal distance, determined by one or more predetermined criteria, is used to calculate the focal distance of another point. In some embodiments, the optimal focal distance of a reference point is used to calculate the optimal focal distance of a different point. For example, reference point 338 may correspond to a point at the center of bounding box 332, a point having the maximum color intensity within bounding box 332, a point determined to be the most likely to contain a biomedical specimen (e.g., as determined using a machine learning model), or another suitable selection criteria.

Still referring to FIGS. 2 and 3A-3B, in some embodiments, localization module 210 may include one or more inline quality controls. For example, and without limitation, localization module 210 characterizes the content present on the slide, may check that image 310 is in focus, that image 310 includes the biological specimen within the field of view, that an amount of debris on the slide or other unwanted artifacts or noise in image 310 does not exceed a predetermined threshold, that a confidence level associated with identifying areas of interest exceeds a predetermined threshold, or the like. When one or more checks returns a negative result, one or more remedial actions may be taken, such as recapturing image 310 with different exposure settings, bringing image processing/ML algorithms to enhance the image etc., indicating to a lab admin the slide preparation, or the like. In some embodiments, the inline quality checks may output information associated with the results of the quality checks, such as a numerical score or an indication of areas of a slide that were found to be low quality, that can be used by subsequent modules in data flow 200.

Still referring to FIGS. 2 and 3A-3B, in some embodiments, the areas of interest identified by localization module 210 may be provided to downstream applications for further processing. For example, localization module 210 may provide a mask to delineate areas of interest with artifacts that should be avoided, inpainted, or otherwise handled by the downstream application.

Figure 4:
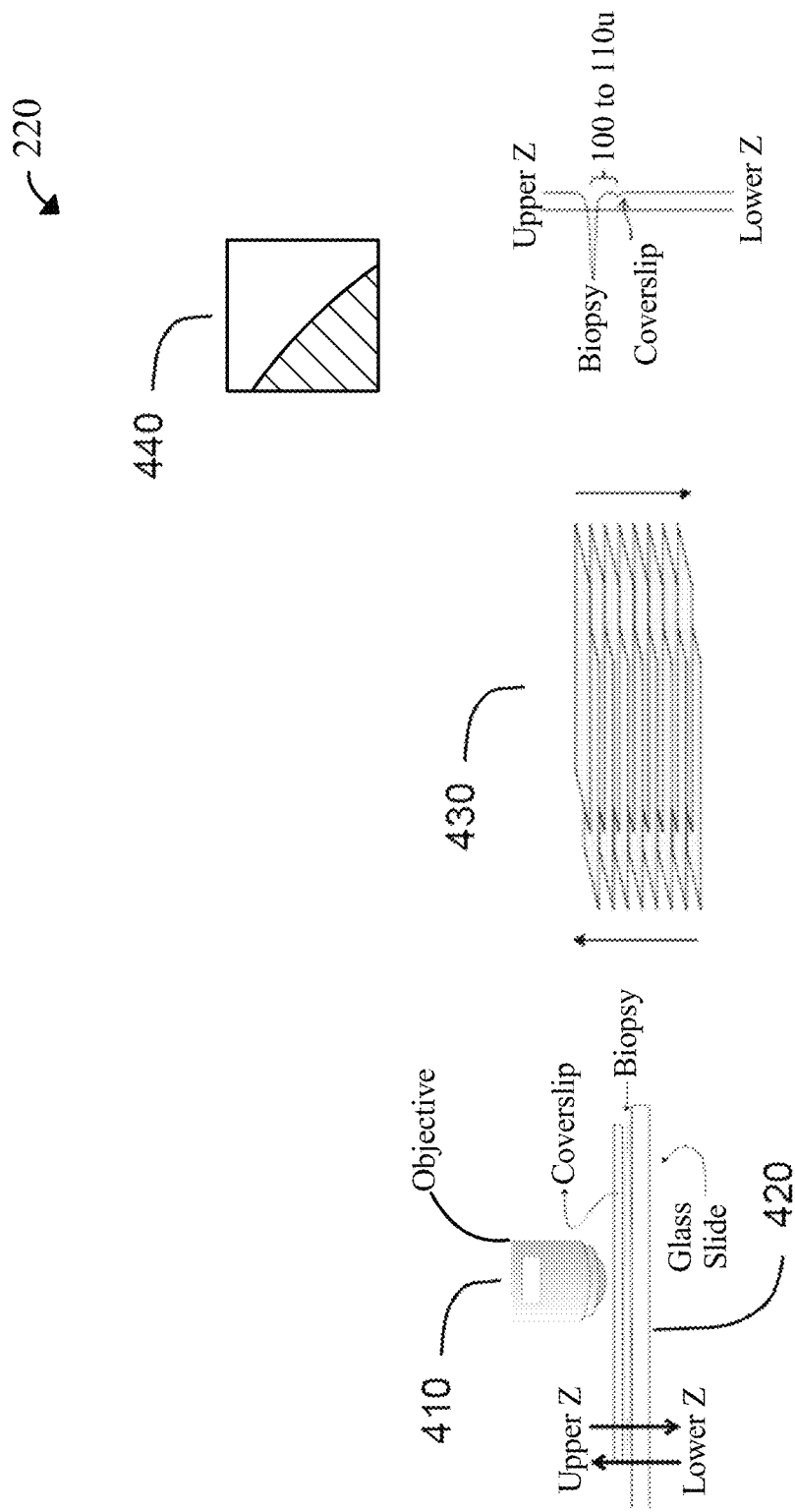
FIG. 4 is a diagram of an exemplary embodiment of a biopsy plane estimation module of a data flow for inline quality control.

Referring now to FIGS. 2 and 4, first quality metric may include biopsy plane estimation quality metric; and determining second scanning parameter may include identifying a plane within a region of interest which contains a biological specimen. As used herein, a "biopsy plane estimation quality metric" is a quality metric which assesses the performance of a biopsy plane estimation module. In some embodiments, biopsy plane estimation quality metric may include one or more composite measures used to evaluate the precision and reliability of biopsy plane estimation module's ability to identify a plane within a region of interest which contains a biological specimen. In other embodiments, localization quality metric may include one or more quantifiable measures utilized by localization module within the system designed to identify a plane within a region of interest which contains a biological specimen. As depicted in FIGS. 2 and 4, data flow 200 may include a biopsy plane estimation module 220. As used herein, a "biopsy plane estimation module" is an automatic system for identifying a plane within a region of interest which contains a biological specimen. Biopsy plane estimation module 220 instructs a scanner 410 (shown in FIG. 4) to perform a scan along the z-axis of a slide 420 at high magnification to identify the plane that contains the biomedical specimen of interest (e.g., a biopsy). For example, scanner 410 may correspond to one of scanners 101-109. Scanner 410 may acquire a series of images 430 along the z-axis using the same high magnification objective lens (e.g., 10×, 20×, or 40×) that will ultimately be used to acquire images used for the digitized slide. One or more attributes of the series of images 430 (e.g., color intensity) may be analyzed to estimate the plane containing the biopsy (or other biomedical specimen), as shown illustratively at process 440. For example, the biopsy plane may correspond to the z-axis coordinate that produces an image with the maximum color intensity.

Still referring to FIGS. 2 and 4, in some embodiments, biopsy plane estimation module 220 may perform biopsy plane estimation at x and y coordinates corresponding to reference point 338 (shown in FIG. 3), e.g., a point determined by localization module 110 to be optimal for biopsy plane estimation. Performing biopsy plane estimation at reference point 338 may improve efficiency by ensuring that the biopsy plane estimation is performed at a location likely to contain a biomedical specimen. For example, the likelihood that biopsy plane estimation is repeated at different locations on the sample, or the likelihood that manual intervention is used to select or adjust the location for biopsy plane estimation, is reduced.

Still referring to FIGS. 2 and 4, in some embodiments, biopsy plane estimation module 220 may include one or more inline quality controls. For example, biopsy plane estimation module 220 may check that the biopsy plane estimation is performed at a location that contains a sufficient amount of the biomedical specimen to accurately perform biopsy plane estimation. When the check returns a negative result, one or more remedial actions may be taken, such as selecting a different location to perform biopsy plane estimation, generating an alert that insufficient biomedical specimen was detected, or the like. In some embodiments, biopsy plane estimation module 220 may output information associated with the results of the quality checks, such as a numerical score, that can be used by subsequent modules in data flow 200. The information may be aggregated with information supplied by preceding modules in data flow 200 (e.g., localization module 210) to provide a running indicator of the quality of the slide digitization process, which may trigger further remedial actions (e.g., rescans or alerts) when the running indictor exceeds a predetermined threshold.

Referring now to FIGS. 2 and 5, first quality metric may include focus sampling quality metric; and determining second scanning parameter may include identifying a focal setting at which a selected point is in focus. As used herein, a "focus sampling quality metric" is a quality metric which assesses the performance of a focus sampling module. In some embodiments, focus sampling quality metric may include one or more composite measures used to evaluate the precision and reliability of focus sampling module's ability to identify a focal setting at which a selected point is in focus. In other embodiments, focus sampling quality metric may include one or more quantifiable measures utilized by focus sampling module within the system designed to identify a focal setting at which a selected point is in focus. As depicted in FIGS. 2 and 5, data flow 200 may include a focus sampling module 230. As used herein, a "focus sampling module" is an automated system for identifying a focal setting at which a selected point is in focus. Focus sampling module 230 may carry out focus optimization at two or more sample points 512 and 514 (shown in FIG. 5) within the scanning grid (e.g., grid 334). Sample points 512 and 514 may be selected in relation to a reference point 520 (e.g., reference point 338). For example, sample points 512 and 514 may be positioned along a same row of the scanning grid as reference point 520. At each of sample points 512 and 514, focus sampling module 230 may instruct the scanner to determine optimal focus settings for subsequent imaging. For example, the optimal focus settings at sample points 512 and 514 may be determined using a variety of known techniques for auto-focusing, e.g. sharpness of the image. When the optimal focus settings at sample points 512 and 514 are different, focus sampling module 230 may determine a gradient (or other suitable functional relationship) of the focus settings such that optimal focus settings for the remaining points in the scanning grid may be estimated, e.g., by interpolation. Focus sampling may therefore provide an efficient technique for estimating the optimal focus settings throughout the scanning grid by performing optimization at a subset of the points in the grid and using gradients to estimate the optimal settings at the remaining points.

Still referring to FIGS. 2 and 5, in some embodiments, focus sampling module 230 may include one or more inline quality controls. For example, focus sampling module 230 may check that the focus sampling is performed at locations that contain a sufficient amount of the biomedical specimen to accurately determine the focus settings. This may be performed by estimating the quality of specimen (e.g. thickness of specimen in z-direction), checking attributes of the specimen such as whether the specimen present on the glass slide corresponds to tissue versus annotation (e.g., pen marks), and confirming planarity of the slide estimated. Such locations may include, in non-limiting examples, fields of view of high resolution images of sections of a slide. When such a check returns a negative result, one or more remedial actions may be taken, such as selecting different locations to perform focus sampling, generating an alert that insufficient biomedical specimen was detected, or the like. In some embodiments, focus sampling module 230 may output information associated with the results of the quality checks, such as a numerical score, that can be used by subsequent modules in data flow 200. The information may be aggregated with information supplied by preceding modules in data flow 200 (e.g., modules 210-220) to provide a running indicator of the quality of the slide digitization process, which may trigger further remedial actions (e.g., rescans or alerts) when the running indictor exceeds a predetermined threshold. In some embodiments, focus sampling inline quality controls may include identifying locations where focus sampling errors are present. For example, locations which are out of focus may be identified, and remedial actions (such as rescans) may be taken for those areas. In some embodiments, such locations may include fields of view of high resolution images of sections of a slide.

Figure 6A:
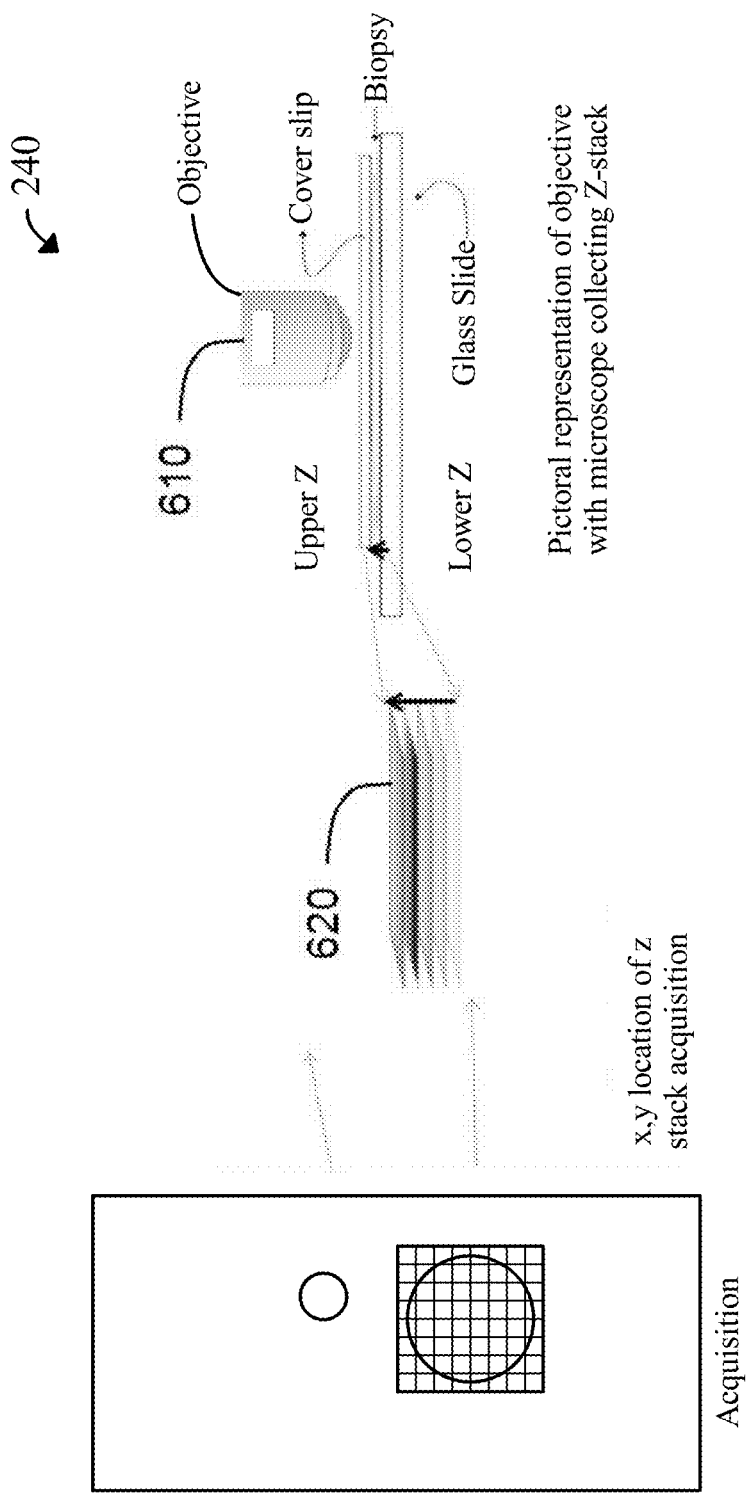
FIGS. 6A-6B are diagrams of an exemplary embodiment of a z-stack acquisition module of a data flow for inline quality control.
Figure 6B:
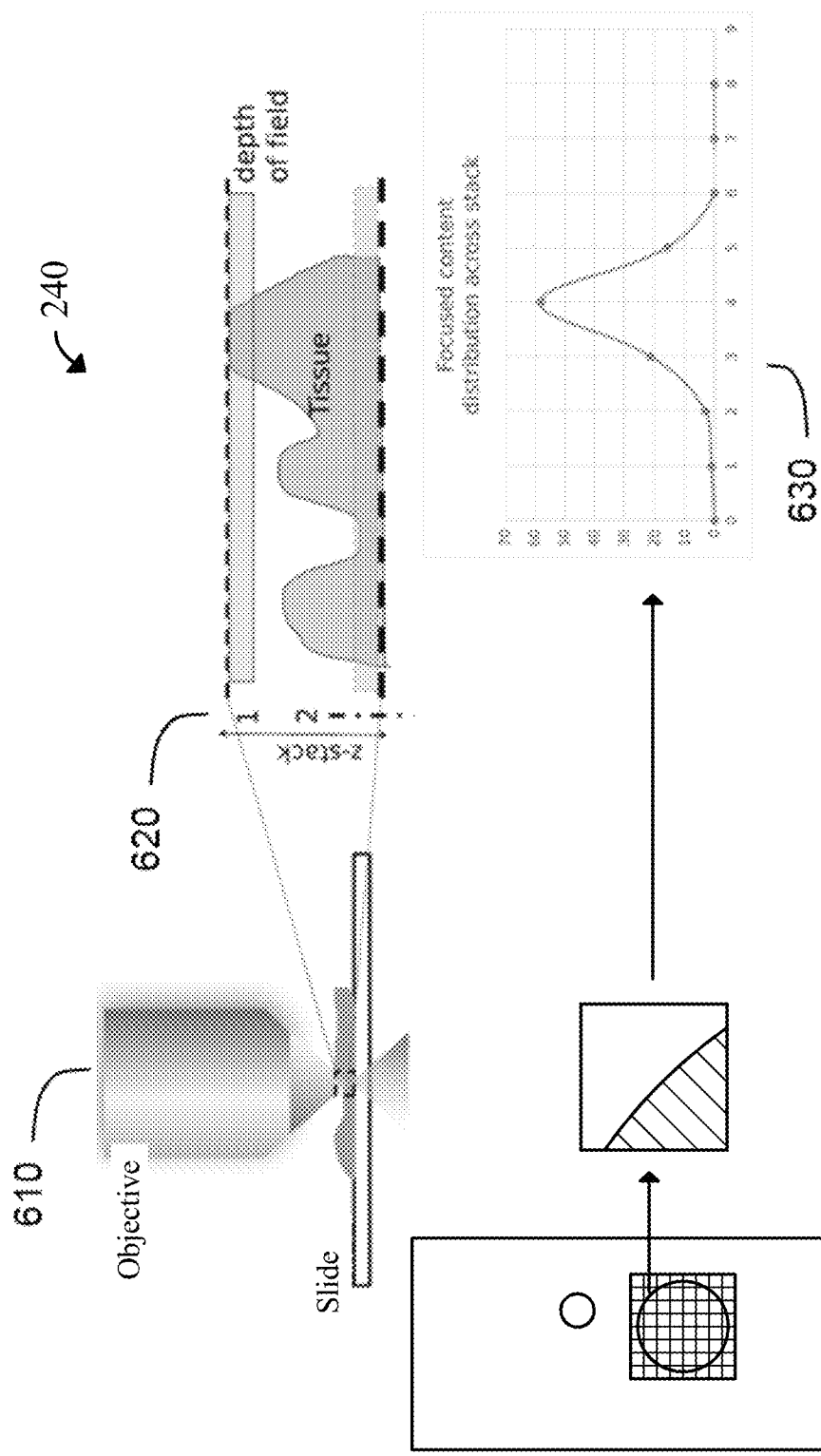

Referring now to FIGS. 2 and 6A-6B, first quality metric may include z-stack acquisition quality metric; and determining second scanning parameter may include using the optical system, capturing a z-stack at a selected point. As used herein, a "2-stack acquisition quality metric" is a quality metric which assesses the performance of a z-stack acquisition module. As depicted in FIGS. 2 and 6A-6B, data flow 200 may include a z-stack acquisition module 240. Based on information provided by preceding modules 210-240 (e.g., the scanning pattern, biopsy plane, and focus settings), z-stack acquisition module 240 instructs a scanner 610 (shown in FIGS. 6A-6B) to acquire a set of images 620 (referred to as a z-stack) along the z-axis of a slide at high magnification. For example, scanner 610 may correspond to one of scanners 101-109. As shown in FIG. 6B, the images in the z-stack may be acquired by sweeping the depth of field using an objective lens of scanner 610. In this manner, features of the biomedical specimen (e.g., the tissue sample) that vary along the z-axis, such as bumps, ridges, and other 3-dimensional features, may come into focus in different layers of the z-stack. In some embodiments, z-stack acquisition module 240 may output an aggregate image based on the set of images in the z-stack. For example, as illustrated in FIG. 6B at process 630, the aggregate image may correspond to a selected image from the z-stack that contains the most in-focus content among the images in the set. Other suitable techniques for aggregating the z-stack images may be used. Z-stack acquisition module 240 may acquire z-stack images at each x-y location in the sample to be scanned (e.g., as determined by localization module 210).

Still referring to FIGS. 2 and 6A-6B, in some embodiments, z-stack acquisition module 240 may include one or more inline quality controls. For example, z-stack acquisition module 240 may check that the amount of in focus image content in the z-stack exceeds a predetermined threshold, that the amount of debris or imaging artifacts in the images is below a predetermined threshold, that the levels of tissue folding and/or slide preparation artifacts are below a predetermined threshold, that the tissue is inside/outside the coverslip or the like, that the detected specimen corresponds to tissue rather than an annotation, or the like. When one or more of these checks return a negative result, one or more remedial actions may be taken, such as reacquiring the z-stack, adjusting the position of the z-stack (e.g., capturing images at a different position along the z-axis), adjusting the z stack size, generating an alert, or the like.

Still referring to FIGS. 2 and 6A-6B, in some embodiments, z-stack acquisition module 240 may track quality indicators associated with each z-stack as scanning proceeds throughout the scanning grid. For example, z-stack acquisition module 240 may count the locations in the scanning grid for which the quality checks produced negative results and may perform a remedial action when the count exceeds a predetermined threshold. In some embodiments, z-stack acquisition module 240 may generate and display a map indicating the quality of each z-stack in the scanning grid.

Still referring to FIGS. 2 and 6A-6B, in some embodiments, z-stack acquisition module 240 may output information associated with the results of the quality checks, such as a numerical score or a map indicating the quality of the z-stack scan at each location in the slide. This information can be used by subsequent modules in data flow 200. The information may be aggregated with information supplied by preceding modules in data flow 200 (e.g., modules 210-230) to provide a running indicator of the quality of the slide digitization process, which may trigger further remedial actions (e.g., rescans or alerts) when the running indictor exceeds a predetermined threshold.

Figure 7A:
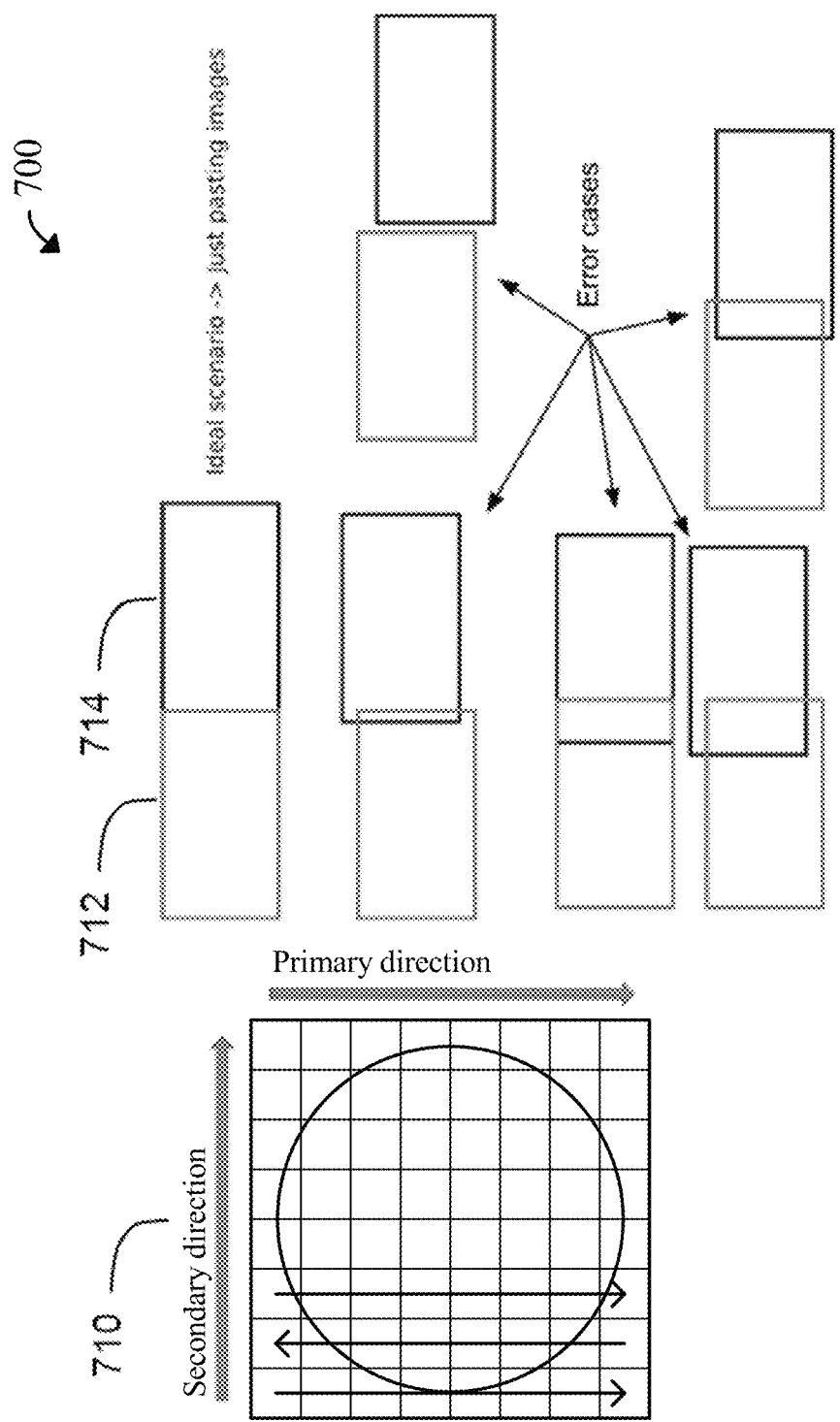
FIGS. 7A-7B are diagrams of an exemplary embodiment of a stitching module of a data flow for inline quality control.
Figure 7B:
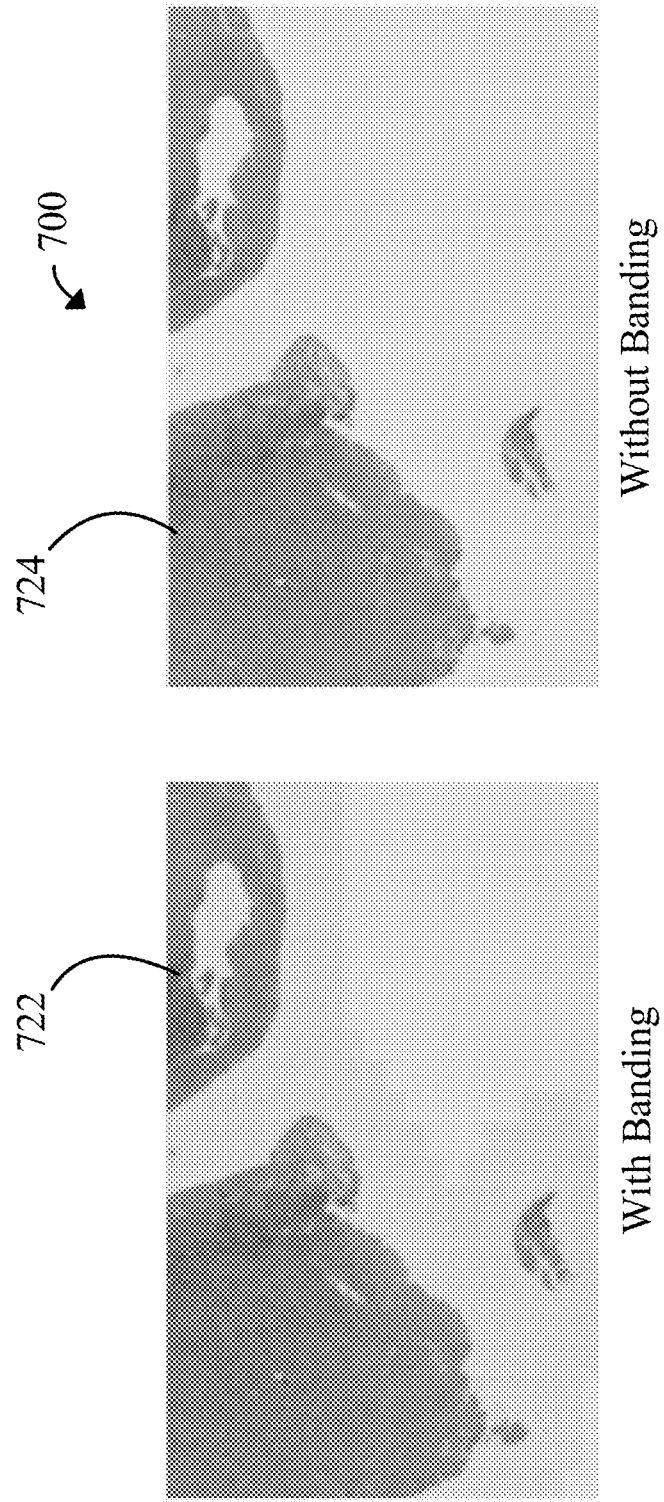

Referring now to FIGS. 2 and 7A-7B, performing a scan of a slide may include, using an optical system, capturing at least a second image as a function of second scanning parameter. In some embodiments, capturing at least a second image may include capturing a plurality of images, and stitching such images together. In some embodiments, performing a scan of a slide may include determining a stitching quality metric as a function of the at least a second image. In some embodiments, performing a scan of a slide may further include determining a third scanning parameter as a function of the stitching quality metric; using the optical system, capturing a second plurality of images as a function of the third scanning parameter; and combining the second plurality of images to create at least a third image. For example, if stitching quality metric is determined such that severe stitching related errors are identified, then additional images may be captured of an affected region, and such images may be used to assemble a corrected image. In some embodiments, image data from both at least a second image and subsequently captured image data is used to assemble at least a third image. As used herein, a "stitching quality metric" is a quality metric which assesses the performance of a stitching module. In some embodiments, stitching quality metric may include one or more composite measures used to evaluate the precision and reliability of stitching module's ability to assemble a larger image from a plurality of images. In other embodiments, localization quality metric may include one or more quantifiable measures utilized by localization module within the system designed to assemble a larger image from a plurality of images. As depicted in FIGS. 2 and 7A-7B, data flow 200 may include a stitching module 250. As used herein, a "stitching module" is an automated system for assembling a larger image from a plurality of images. Stitching module 230 aligns and stitches together (also referred to as pasting or fusing) adjacent images within the scanning grid 710 (shown in FIG. 7A) to form an aggregated output image. In an ideal scenario, each pair of adjacent images acquired by the scanner (e.g., images 712 and 714) is aligned without observable gaps, overlaps, or offsets between the images, including in the x, y, and z directions. In practice, however, such defects may be present and may result in artifacts such as ghosting (e.g., regions that are blurred due to stitching errors). Another type of artifact that may arise due to stitching is the visual effect of banding, as illustrated in FIG. 7B. In an image with banding 722, artifacts such as vertical lines may appear along the axes corresponding to the scanning grid.

Still referring to FIGS. 2 and 7A-7B, in some embodiments, stitching module 250 may include one or more inline quality controls to address stitching errors, such as ghosting artifacts and displacement. For example, stitching module 250 may check that the presence of such artifacts in the output image is below a predetermined threshold. When the threshold is exceeded, one or more remedial actions may be taken, such as rescanning portions of the slide where the artifacts were present, or the like. Additional remedial actions may include triggering a non-inline stitching process. For example, A scanning process may be completed, and a subsequent stitching process may be started. In some embodiments, the inline quality checks may output information associated with the results of the quality checks, such as a numerical score indicating the level of stitching artifacts, that can be used by subsequent modules in data flow 200. The information may be aggregated with information supplied by preceding modules in data flow 200 (e.g., modules 210-240) to provide a running indicator of the quality of the slide digitization process, which may trigger further remedial actions (e.g., rescans or alerts) when the running indictor exceeds a predetermined threshold.

Returning to FIG. 2, performing a scan may further include determining a second quality metric as a function of at least a first image; determining a combination quality metric as a function of first quality metric and second quality metric; determining a third scanning parameter as a function of the combination quality metric; and using optical system, capturing at least a third image as a function of second scanning parameter. Data flow 200 may include a whole slide assessment module 260. As used herein, a "whole slide assessment module" is an automated system for analyzing an output image generated by a stitching module. Whole slide assessment module 260 may perform a variety of quality checks on the output image and/or may synthesize the results of quality checks performed by modules 210-250. For example, whole slide assessment module 260 may perform a final quality check on the output image to trap out of focus, stitching, banding, missed specimen, z-stack shift errors (x,y shift across the image along the z plane of stack), or the like. When the check produces a negative result, one or more remedial actions may be taken such as rescanning portions of the slide where the errors were detected. In some embodiments, the slide may remain in the scanner during these quality checks, such that taking a remedial action (e.g., rescanning a portion of the slide) involves little or no additional setup time.

Still referring to FIG. 2, in some embodiments, whole slide assessment module 260 may generate or compile a representation of the slide (e.g., a map or other suitable representation) that delineates portions of the output image in which artifacts persist but are within an acceptable threshold (e.g., portions in which errors are detected but not fully resolved by the quality controls identified above). The representation may enable the downstream application to handle the remaining artifacts in a suitable manner, e.g., by avoiding or applying inpainting techniques to the portions of the image that contain artifacts.

Still referring to FIG. 2, in some embodiments, performing a scan of a slide may further include algorithmically removing a banding error from an image such as at least a second image. In some embodiments, banding errors may be a product of non-uniform lighting across images and/or regions of images.

Still referring to FIG. 2, in some embodiments, an error may be flagged. For example, an error may be flagged based on a quality metric. In some embodiments, an error may be flagged as a function of a focus sampling quality metric. In some embodiments, an error may be flagged as a function of a stitching quality metric. In some embodiments, an error may be flagged if re-scanning a slide and/or a region of a slide does not sufficiently lead to a reduction in a quality metric. In some embodiment, prevalence and/or severity of errors may be tracked using a map. For example, a map may depict sections of an image and quality metrics associated with such sections of the image. For example, a map may include an overlay over an image which is color coded according to a particular quality metric and/or an aggregate measure of multiple quality metrics. In some embodiments, a map may be used to expedite manual quality control of an image. For example, a map may be output to a user using a display as described below in order to aid the user in a quality control process.

Still referring to FIG. 2, in some embodiments, system 100 may transmit one or more images and/or maps to an external device. Such an external device may include, in non-limiting examples, a phone, tablet, or computer. In some embodiments, such a transmission may configure the external device to display an image.

Still referring to FIG. 2, in some embodiments, system 100 may determine a visual element data structure. In some embodiments, system 100 may display to a user a visual element as a function of visual element data structure. As used herein, a "visual element data structure" is a data structure describing a visual element. As non-limiting examples, visual elements May include at least a first image, at least a second image, at least a third image, a map, and elements of a GUI.

Still referring to FIG. 2, in some embodiments, a visual element data structure may include a visual element. As used herein, a "visual element" is a datum that is displayed visually to a user. In some embodiments, a visual element data structure may include a rule for displaying visual element. In some embodiments, a visual element data structure may be determined as a function of first image, second image, and/or hybrid image. In some embodiments, a visual element data structure may be determined as a function of an item from the list consisting of at least a first image, at least a second image, at least a third image, elements of a GUI, first scanning parameter second scanning parameter, third scanning parameter, first quality metric, and stitching quality metric. In a non-limiting example, a visual element data structure may be generated such that visual element depicting at least a second image is displayed to a user.

Still referring to FIG. 2, in some embodiments, visual element may include one or more elements of text, images, shapes, charts, particle effects, interactable features, and the like. As a non-limiting example, a visual element may include a touch screen button for setting magnification level.

Still referring to FIG. 2, a visual element data structure may include rules governing if or when visual element is displayed. In a non-limiting example, a visual element data structure may include a rule causing a visual element including a scanning parameter to be displayed when a user selects an image captured using that scanning parameter using a GUI.

Still referring to FIG. 2, a visual element data structure may include rules for presenting more than one visual element, or more than one visual element at a time. In an embodiment, about 1, 2, 3, 4, 5, 10, 20, or 50 visual elements are displayed simultaneously. For example, a plurality of images and/or GUI elements may be displayed simultaneously.

Still referring to FIG. 2, in some embodiments, apparatus 100 may transmit visual element to a display such as output interface. A display may communicate visual element to user. A display may include, for example, a smartphone screen, a computer screen, or a tablet screen. A display may be configured to provide a visual interface. A visual interface may include one or more virtual interactive elements such as, without limitation, buttons, menus, and the like. A display may include one or more physical interactive elements, such as buttons, a computer mouse, or a touchscreen, that allow user to input data into the display. Interactive elements May be configured to enable interaction between a user and a computing device. In some embodiments, a visual element data structure is determined as a function of data input by user into a display.

Still referring to FIG. 2, a variable and/or datum described herein may be represented as a data structure. In some embodiments, a data structure may include one or more functions and/or variables, as a class might in object-oriented programming. In some embodiments, a data structure may include data in the form of a Boolean, integer, float, string, date, and the like. In a non-limiting example, a quality metric data structure may include an int value representing a degree to which an image is in focus. In some embodiments, data in a data structure may be organized in a linked list, tree, array, matrix, tenser, and the like. In some embodiments, a data structure may include or be associated with one or more elements of metadata. A data structure may include one or more self-referencing data elements, which processor may use in interpreting the data structure. In a non-limiting example, a data structure may include "<date>" and "</date>," tags, indicating that the content between the tags is a date.

Figure 8:
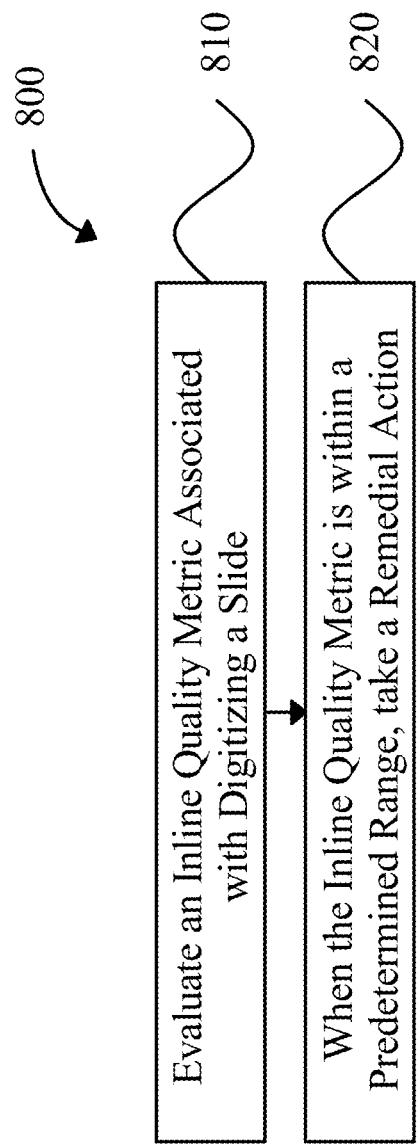
FIG. 8 is a flow diagram of an exemplary embodiment of a method for inline quality control of slide digitization.

Referring now to FIG. 8, a simplified diagram of a method 800 for inline quality control of slide digitization according to some embodiments is provided. According to some embodiments consistent with other figures, method 800 may be performed by processor 130 during the execution of inline quality control program identification program 150. For example, method 800 may be performed using one or more of modules 210-260.

Still referring to FIG. 8, at process step 810, an inline quality metric associated with digitizing a slide is evaluated. In some embodiments, the inline quality metric may correspond to one or more of the inline quality controls described previously with respect to FIGS. 2-7B. For example, the inline quality metric may include a value that indicates the presence of defects in one or more slide images, such as debris, out-of-focus errors, stitching artifacts, misalignments, lack of a biomedical specimen, or the like. In some embodiments, the inline quality metric may correspond to an aggregate metric that is accumulated over multiple stages of the slide digitization process (e.g., multiple modules of data flow 200). The inline quality metric can be quantitative (e.g., a numerical score or a count), qualitative (e.g., good, fair, poor), or a combination thereof. Evaluating the inline quality metric may include applying a machine learning model trained to identify defects and/or other image features relevant to inline quality control.

Still referring to FIG. 8, at process step 820, a remedial action is taken in response to a determination that the inline quality metric is within a predetermined range. For example, the inline quality metric may be within the predetermined range when its value exceeds a predetermined threshold, drops below a predetermined threshold, takes on a value identified as being associated with a defect (e.g., "poor" or "out-of-focus"), or the like. In some embodiments, the remedial action may include taking one or more of the remedial actions described previously with respect to FIGS. 2-7B. For example, the remedial action may include rescanning all or a portion of the slide, alerting a clinician, fixing an identified defect (e.g., applying image processing methods to reduce artifacts, inpainting one or more portions of the image using a generative machine learning model, or the like), generating a representation of the slide that indicates the presence or locations of defects for downstream applications, or the like. In some embodiments, the remedial action may be taken prior to removing the slide from the scanner, such that the set-up and/or take-down time associated with the remedial action is reduced, and manual intervention is likewise reduced.

Still referring to FIG. 8, in some embodiments, there may be multiple predetermined ranges associated with different remedial actions. For example, when the inline quality metric falls within a first predetermined range (e.g., a range indicative of the slide having an acceptable level of defects), the remedial action may include fixing the identified defects and/or identifying the presence or location of the defects for downstream processing stages. When the inline quality metric falls within a second predetermined range (e.g., a range indicative of the slide having an unacceptable level of defects), the remedial action may include initiating a rescan and/or alerting a clinician.

Figure 9:
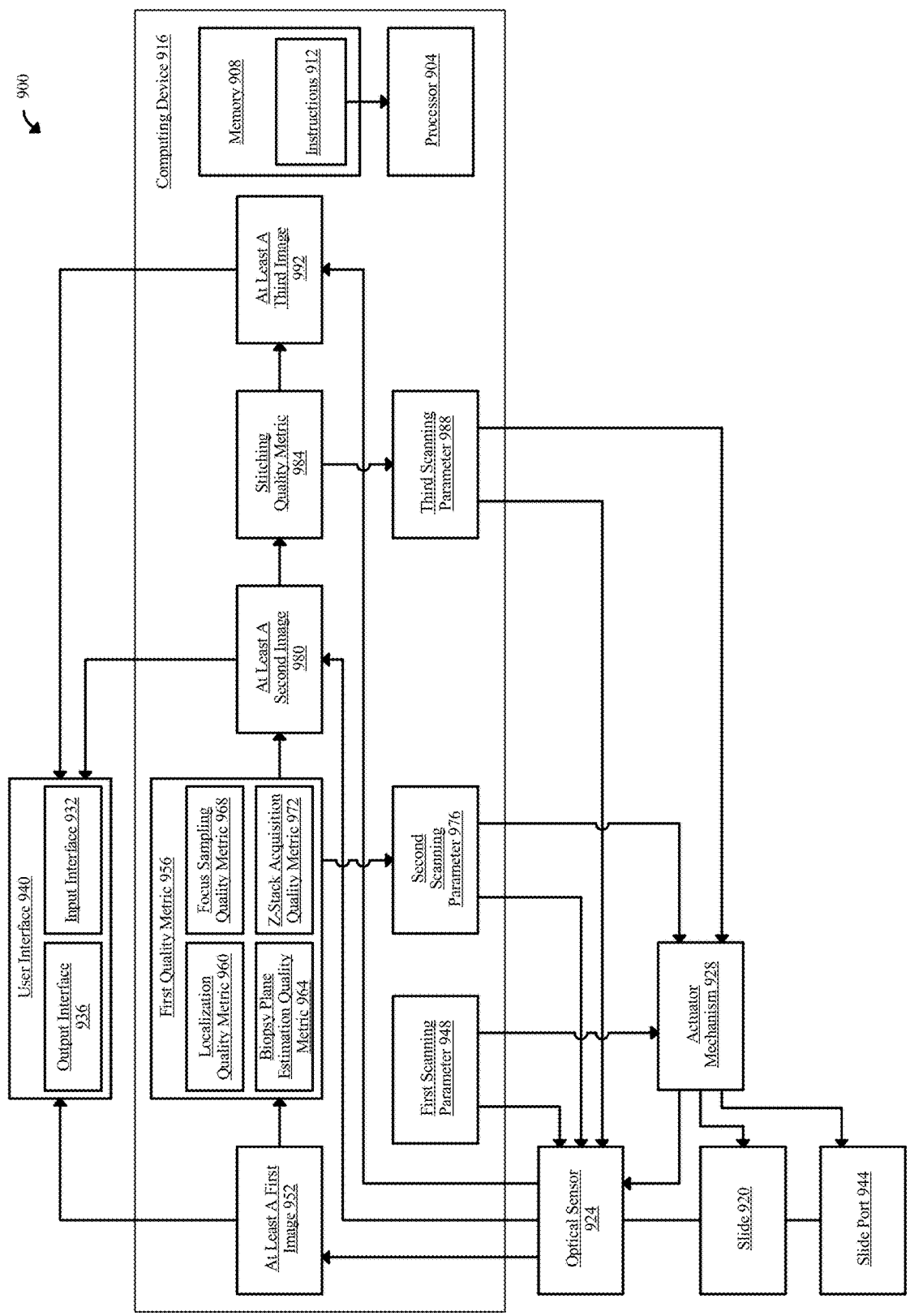
FIG. 9 is a diagram depicting an exemplary embodiment of a system for digitizing a slide.

Still referring to FIG. 9, a box diagram depicting an exemplary embodiment of a system 900 for digitizing a slide is provided. System 900 may include processor 904, and memory 908 containing instructions 912 configuring processor 904 to perform one or more processes described herein. Computing device 916 may include processor 904, and memory 908, and may interact with other elements of system 900, such as by configuring elements of an optical system to capture images, configuring an actuator mechanism to move, configuring a user interface to display information and the like. System 900 may further include slide 920, such as a glass slide containing a biological sample. Optical sensor 924 may be used to capture one or more images of slide 920. Actuator mechanism 928 may be used to move optical sensor 924, slide port 944, and/or slide 920 into correct positions for images to be captured according to desired parameters. System 900 may further include input interface 932, such as a mouse and keyboard, output interface 936 such as a screen and speaker system, and user interface 940 which includes input interface 932 and output interface 936. Computing device 916 may use settings according to first scanning parameter 948 to capture at least a first image 952. At least a first image 952 may be used to determine first quality metric 956. First quality metric 956 may include localization quality metric 960, biopsy plane estimation quality metric 964, focus sampling quality metric 968, and/or z-stack acquisition quality metric 972. First quality metric 956 may be used to determine second scanning parameter 976. Settings of second scanning parameter 976 may be used to capture at least a second image 980. Stitching quality metric 984 may be determined as a function of at least a second image 980, such as in a case in which second image 980 is assembled from a plurality of images each covering narrower regions of slide 920. Third scanning parameter 988 may be determined as a function of stitching quality metric 984, and at least a third image 992 may be captured using settings of third scanning parameter 988. One or more of at least a first image 952, at least a second image 980, and at least a third image 992 may be displayed using user interface 940. In a non-limiting example, system 900 may capture a macro image which includes in frame the entirety of a biological sample which a user desires a high resolution image of. In this example, system 900 may use this macro image to identify one or more parameters for capturing subsequent images as described herein; such parameters may include a region within the macro image which contains the sample, a row within this region in which the sample is present, a focal distance at one or more points are in focus, and the like. In this example, system 900 may use such parameters to capture a plurality of images and may assemble a high resolution image from this plurality of images. This plurality of images may be checked for errors, such as stitching errors, and these errors may be corrected. A final image may be displayed to a user using a user interface.

Figure 10:
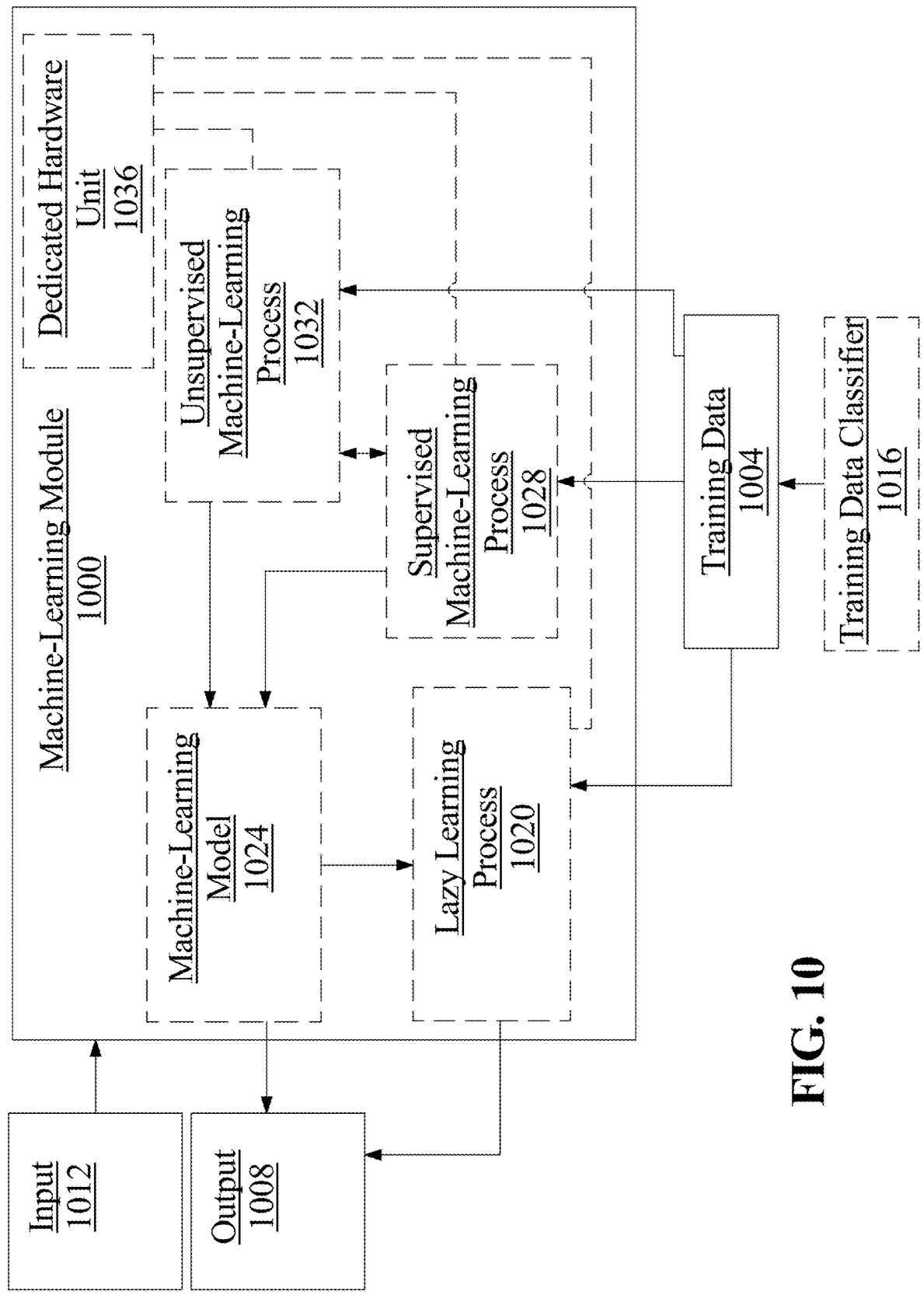
FIG. 10 is a box diagram of an exemplary machine learning model.

Referring now to FIG. 10, an exemplary embodiment of a machine-learning module 1000 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 1004 to generate an algorithm instantiated in hardware or software logic, data structures, and/or functions that will be performed by a computing device/module to produce outputs 1008 given data provided as inputs 1012; this is in contrast to a non-machine learning software program where the commands to be executed are determined in advance by a user and written in a programming language.

Still referring to FIG. 10, "training data," as used herein, is data containing correlations that a machine-learning process may use to model relationships between two or more categories of data elements. For instance, and without limitation, training data 1004 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 1004 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 1004 according to various correlations; correlations may indicate causative and/or predictive links between categories of data elements, which may be modeled as relationships such as mathematical relationships by machine-learning processes as described in further detail below. Training data 1004 may be formatted and/or organized by categories of data elements, for instance by associating data elements with one or more descriptors corresponding to categories of data elements. As a non-limiting example, training data 1004 may include data entered in standardized forms by persons or processes, such that entry of a given data element in a given field in a form may be mapped to one or more descriptors of categories. Elements in training data 1004 may be linked to descriptors of categories by tags, tokens, or other data elements; for instance, and without limitation, training data 1004 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 10, training data 1004 may include one or more elements that are not categorized; that is, training data 1004 may not be formatted or contain descriptors for some elements of data. Machine-learning algorithms and/or other processes may sort training data 1004 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 1004 to be made applicable for two or more distinct machine-learning algorithms as described in further detail below. Training data 1004 used by machine-learning module 1000 may correlate any input data as described in this disclosure to any output data as described in this disclosure. As a non-limiting illustrative example, inputs may include image data and outputs may include text data.

Further referring to FIG. 10, training data may be filtered, sorted, and/or selected using one or more supervised and/or unsupervised machine-learning processes and/or models as described in further detail below; such models may include without limitation a training data classifier 1016. Training data classifier 1016 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 1000 may generate a classifier using a classification algorithm, defined as a processes whereby a computing device and/or any module and/or component operating thereon derives a classifier from training data 1004. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 1016 may classify elements of training data to individual glyphs as in an OCR machine learning model.

With further reference to FIG. 10, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 10, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 10, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 10, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 10, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 10, machine-learning module 1000 may be configured to perform a lazy-learning process 1020 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 1004. Heuristic may include selecting some number of highest-ranking associations and/or training data 1004 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 10, machine-learning processes as described in this disclosure may be used to generate machine-learning models 1024. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 1024 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 1024 may be generated by creating an artificial neural network, such as a convolutional neural network comprising an input layer of nodes, one or more intermediate layers, and an output layer of nodes. Connections between nodes may be created via the process of "training" the network, in which elements from a training data 1004 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 10, machine-learning algorithms may include at least a supervised machine-learning process 1028. At least a supervised machine-learning process 1028, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include image data as described above as inputs, classification to particular characters as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 1004. Persons skilled in the art, upon reviewing the entirety of this disclosure, will be aware of various possible variations of at least a supervised machine-learning process 1028 that may be used to determine relation between inputs and outputs. Supervised machine-learning processes may include classification algorithms as defined above.

With further reference to FIG. 10, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 10, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 10, machine learning processes may include at least an unsupervised machine-learning processes 1032. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 1032 may not require a response variable; unsupervised processes 1032 may be used to find interesting patterns and/or inferences between variables, to determine a degree of correlation between two or more variables, or the like.

Still referring to FIG. 10, machine-learning module 1000 may be designed and configured to create a machine-learning model 1024 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 10, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 10, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 10, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 10, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 10, one or more processes or algorithms described above may be performed by at least a dedicated hardware unit 1036. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 1036 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 1036 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 1036 to perform one or more operations described herein, such as evaluation of model and/or algorithm outputs, one-time or iterative updates to parameters, coefficients, weights, and/or biases, and/or any other operations such as vector and/or matrix operations as described in this disclosure.

With continued reference to FIG. 10, system 100 may use user feedback to train the machine-learning models and/or classifiers described above. For example, classifier may be trained using past inputs and outputs of classifier. In some embodiments, if user feedback indicates that an output of classifier was "bad," then that output and the corresponding input may be removed from training data used to train classifier, and/or may be replaced with a value entered by, e.g., another user that represents an ideal output given the input the classifier originally received, permitting use in retraining, and adding to training data; in either case, classifier may be retrained with modified training data as described in further detail below. In some embodiments, training data of classifier may include user feedback.

With continued reference to FIG. 10, in some embodiments, an accuracy score may be calculated for classifier using user feedback. For the purposes of this disclosure, "accuracy score," is a numerical value concerning the accuracy of a machine-learning model. For example, a plurality of user feedback scores may be averaged to determine an accuracy score. In some embodiments, a cohort accuracy score may be determined for particular cohorts of persons. For example, user feedback for users belonging to a particular cohort of persons may be averaged together to determine the cohort accuracy score for that particular cohort of persons and used as described above. Accuracy score or another score as described above may indicate a degree of retraining needed for a machine-learning model such as a classifier; system 100 may perform a larger number of retraining cycles for a higher number (or lower number, depending on a numerical interpretation used), and/or may collect more training data for such retraining, perform more training cycles, apply a more stringent convergence test such as a test requiring a lower mean squared error, and/or indicate to a user and/or operator that additional training data is needed.

Figure 11:
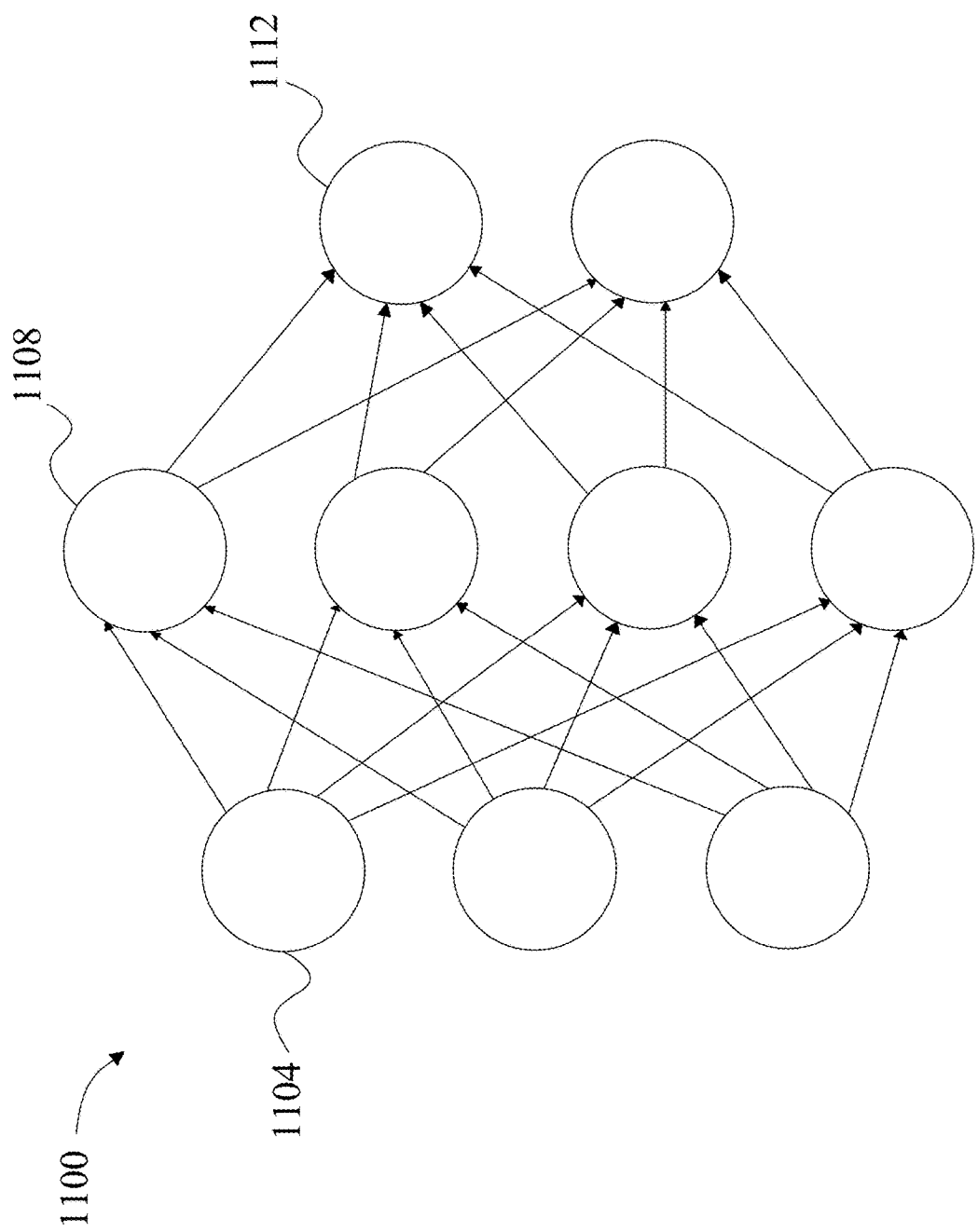
FIG. 11 is a diagram of an exemplary neural network.

Referring now to FIG. 11, an exemplary embodiment of neural network 1100 is illustrated. A neural network 1100 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 1104, one or more intermediate layers 1108, and an output layer of nodes 1112. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 12:
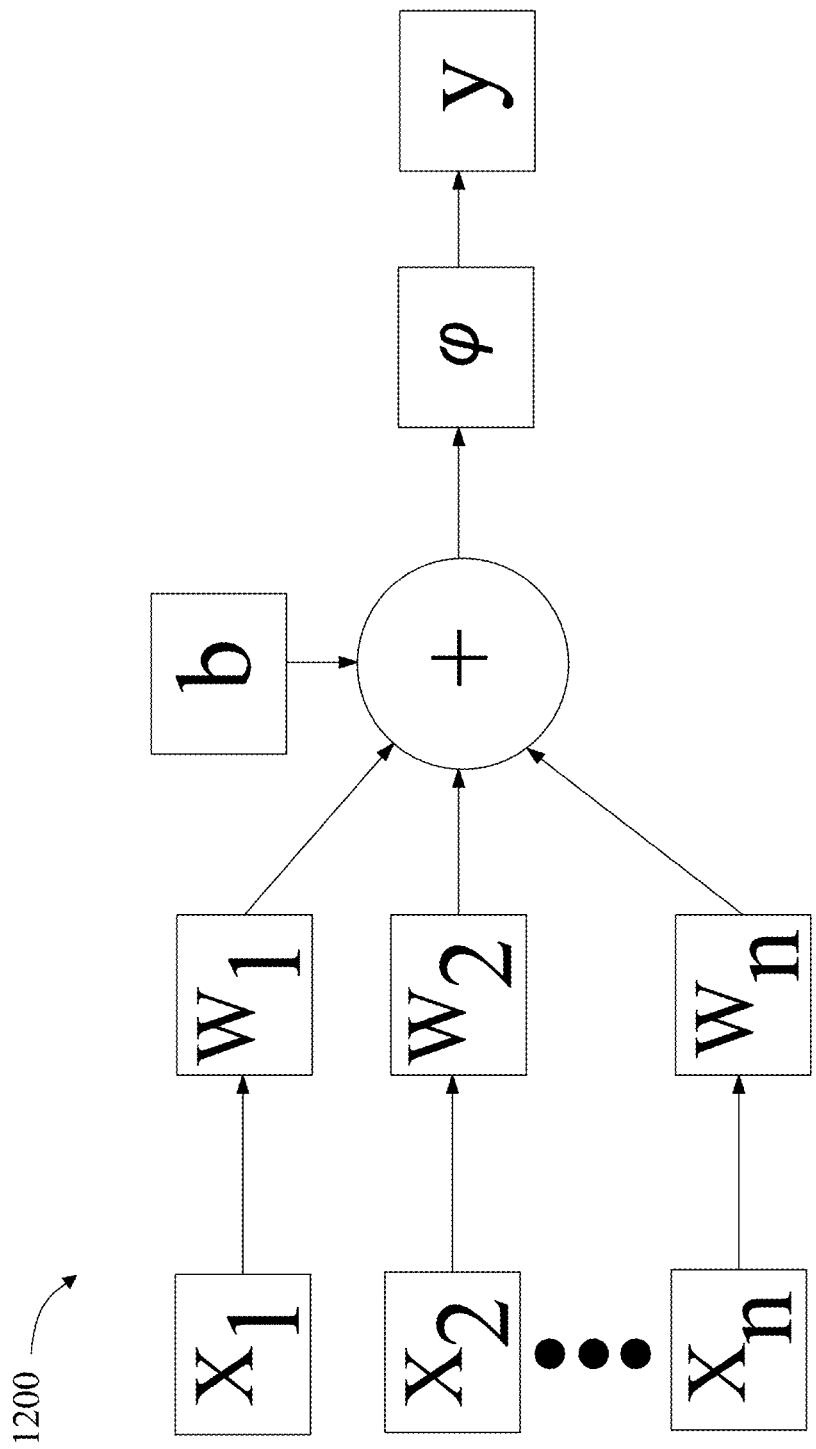
FIG. 12 is a diagram of an exemplary neural network node.

Referring now to FIG. 12, an exemplary embodiment of a node 1200 of a neural network is illustrated. A node may include, without limitation a plurality of inputs x; that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of a (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Still referring to FIG. 12, a "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like. CNN may include, without limitation, a deep neural network (DNN) extension, where a DNN is defined as a neural network with two or more hidden layers.

Still referring to FIG. 12, in some embodiments, a convolutional neural network may learn from images. In non-limiting examples, a convolutional neural network may perform tasks such as classifying images, detecting objects depicted in an image, segmenting an image, and/or processing an image. In some embodiments, a convolutional neural network may operate such that each node in an input layer is only connected to a region of nodes in a hidden layer. In some embodiments, the regions in aggregate may create a feature map from an input layer to the hidden layer. In some embodiments, a convolutional neural network may include a layer in which the weights and biases for all nodes are the same. In some embodiments, this may allow a convolutional neural network to detect a feature, such as an edge, across different locations in an image.

Figure 13:
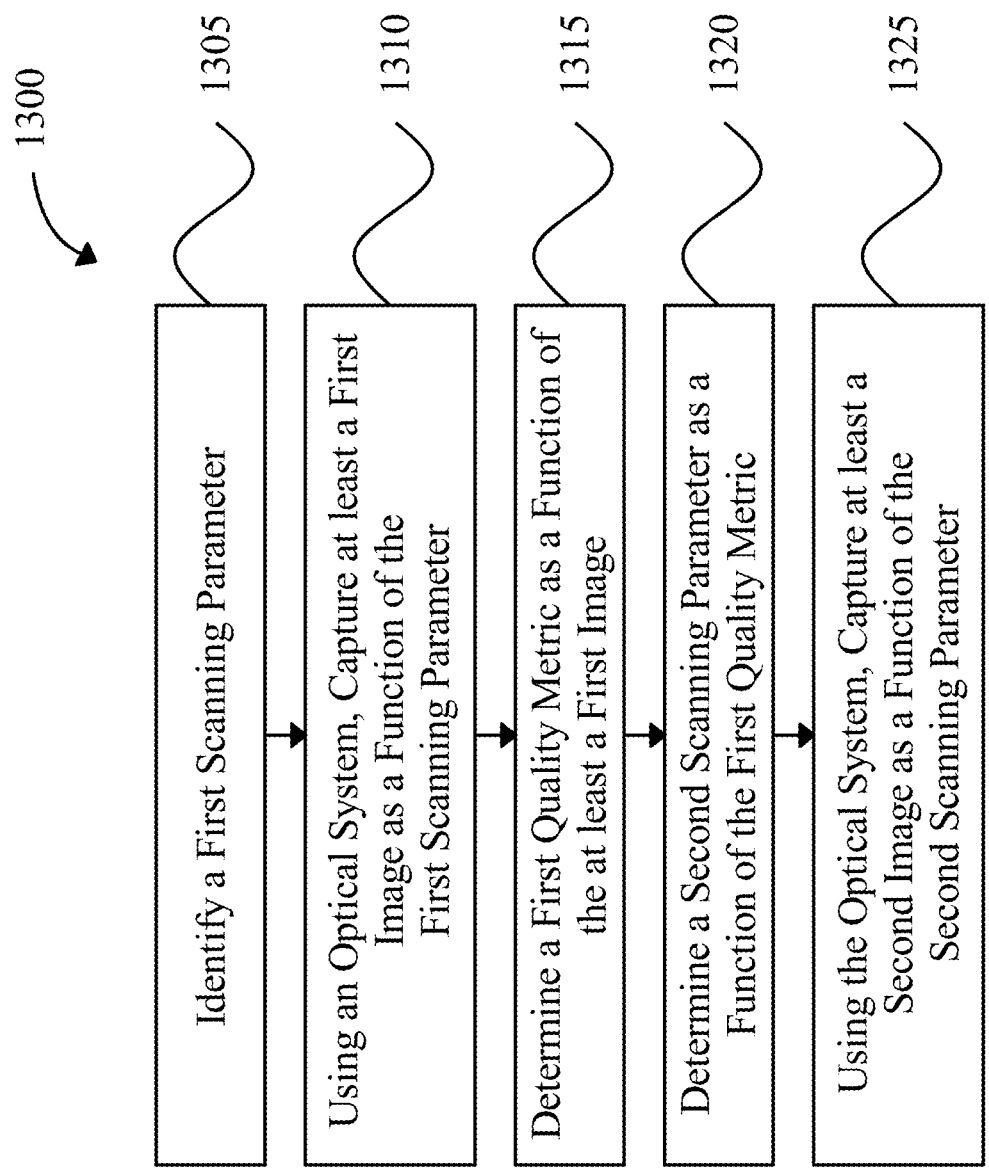
FIG. 13 is a flow diagram depicting an exemplary embodiment of a method of digitizing a slide.

Referring now to FIG. 13, an exemplary embodiment of a method 1300 of digitizing a slide is illustrated. One or more steps if method 1300 may be implemented, without limitation, as described with reference to other figures. One or more steps of method 1300 may be implemented, without limitation, using at least a processor. Method 1300 may include performing a scan of a slide by capturing at least a first image and capturing at least a second image.

Still referring to FIG. 13, in some embodiments, performing a scan of a slide may include identifying a first scanning parameter 1305.

Still referring to FIG. 13, in some embodiments, performing a scan of a slide may include using an optical system, capturing the at least a first image as a function of the first scanning parameter 1310.

Still referring to FIG. 13, in some embodiments, performing a scan of a slide may include determining a first quality metric as a function of the at least a first image 1315. In some embodiments, the first quality metric includes a localization quality metric; and determining the second scanning parameter includes identifying at least a region of interest of the slide. In some embodiments, the first quality metric includes a biopsy plane estimation quality metric; and determining the second scanning parameter includes identifying a plane within a region of interest which contains a biological specimen. In some embodiments, the first quality metric includes a focus sampling quality metric; and determining the second scanning parameter includes identifying a focal setting at which a selected point is in focus. In some embodiments, the first quality metric includes a z-stack acquisition quality metric; and determining the second scanning parameter includes, using the optical system, capturing a z-stack at a selected point.

Still referring to FIG. 13, in some embodiments, performing a scan of a slide may include determining a second scanning parameter as a function of the first quality metric 1320.

Still referring to FIG. 13, in some embodiments, performing a scan of a slide may include using the optical system, capturing the at least a second image as a function of the second scanning parameter 1325. In some embodiments, the at least a first image includes a macro image; and capturing the at least a second image includes, using the optical system, capturing a first plurality of images; and combining the first plurality of images to create the at least a second image.

Still referring to FIG. 13, in some embodiments, performing the scan further includes determining a stitching quality metric as a function of the at least a second image; determining a third scanning parameter as a function of the stitching quality metric; using the optical system, capturing a second plurality of images as a function of the third scanning parameter; and combining the second plurality of images to create at least a third image. In some embodiments, performing the scan further includes capturing the at least a first image at a first location and capturing the at least a second image at a second location. In some embodiments, performing the scan further comprises determining a second quality metric as a function of the at least a first image; determining a combination quality metric as a function of the first quality metric and the second quality metric; determining a third scanning parameter as a function of the combination quality metric; and using the optical system, capturing at least a third image as a function of the second scanning parameter. In some embodiments, performing the scan further includes algorithmically removing a banding error from the at least a second image. In some embodiments, upon detection of a banding error and/or banding errors of sufficient severity, a remedial action may be taken. Remedial actions may include, in non-limiting examples, pausing a scanner, triggering a cleaning mechanism in order to remove and/or reduce banding errors, and/or switching to alternative optical components.

In some embodiments, one or more aspects of a system described herein may be implemented as described in U.S. patent application Ser. No. 18/384,840, filed on Oct. 28, 2023, and titled "APPARATUS AND METHODS FOR SLIDE IMAGING," the entirety of which is hereby incorporated by reference. For example, localization module, biopsy plane estimation module, focus sampling module, z-stack acquisition module, stitching module, and/or whole slide assessment module may be implemented as described in the incorporated patent application.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 14:
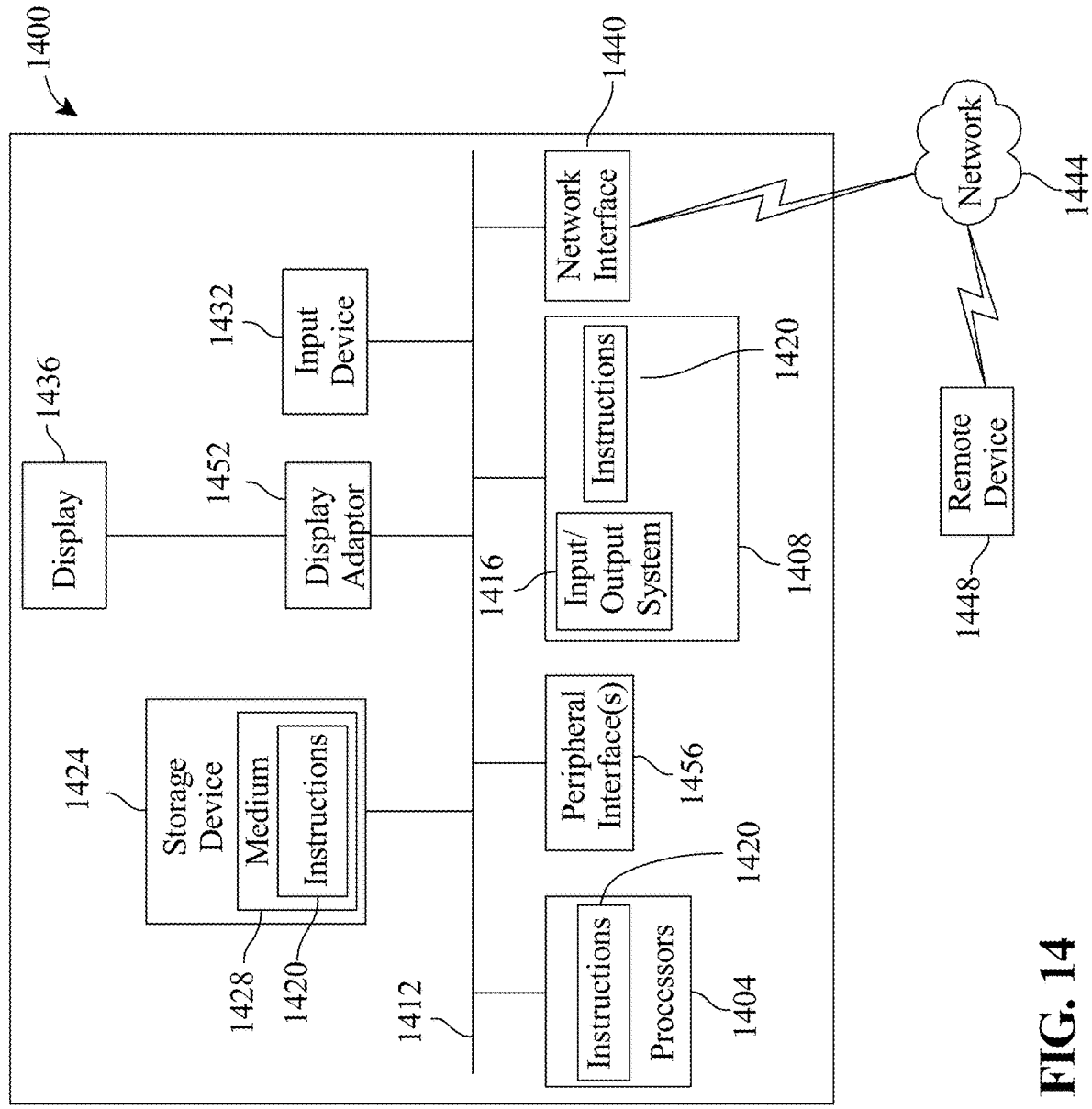
FIG. 14 is a block diagram of a computing system that can be used to implement any one or more of the methodologies disclosed herein and any one or more portions thereof.

FIG. 14 shows a diagrammatic representation of one embodiment of a computing device in the exemplary form of a computer system 1400 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1400 includes a processor 1404 and a memory 1408 that communicate with each other, and with other components, via a bus 1412. Bus 1412 may include any of several types of bus structures including, but not limited to, a memory bus, a memory controller, a peripheral bus, a local bus, and any combinations thereof, using any of a variety of bus architectures.

Processor 1404 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1404 may be organized according to Von Neumann and/or Harvard architecture as a non-limiting example. Processor 1404 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1408 may include various components (e.g., machine-readable media) including, but not limited to, a random-access memory component, a read only component, and any combinations thereof. In one example, a basic input/output system 1416 (BIOS), including basic routines that help to transfer information between elements within computer system 1400, such as during start-up, may be stored in memory 1408. Memory 1408 may also include (e.g., stored on one or more machine-readable media) instructions (e.g., software) 1420 embodying any one or more of the aspects and/or methodologies of the present disclosure. In another example, memory 1408 may further include any number of program modules including, but not limited to, an operating system, one or more application programs, other program modules, program data, and any combinations thereof.

Computer system 1400 may also include a storage device 1424. Examples of a storage device (e.g., storage device 1424) include, but are not limited to, a hard disk drive, a magnetic disk drive, an optical disc drive in combination with an optical medium, a solid-state memory device, and any combinations thereof. Storage device 1424 may be connected to bus 1412 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1424 (or one or more components thereof) may be removably interfaced with computer system 1400 (e.g., via an external port connector (not shown)). Particularly, storage device 1424 and an associated machine-readable medium 1428 may provide nonvolatile and/or volatile storage of machine-readable instructions, data structures, program modules, and/or other data for computer system 1400. In one example, software 1420 may reside, completely or partially, within machine-readable medium 1428. In another example, software 1420 may reside, completely or partially, within processor 1404.

Computer system 1400 may also include an input device 1432. In one example, a user of computer system 1400 may enter commands and/or other information into computer system 1400 via input device 1432. Examples of an input device 1432 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1432 may be interfaced to bus 1412 via any of a variety of interfaces (not shown) including, but not limited to, a serial interface, a parallel interface, a game port, a USB interface, a FIREWIRE interface, a direct interface to bus 1412, and any combinations thereof. Input device 1432 may include a touch screen interface that may be a part of or separate from display 1436, discussed further below. Input device 1432 may be utilized as a user selection device for selecting one or more graphical representations in a graphical interface as described above.

A user may also input commands and/or other information to computer system 1400 via storage device 1424 (e.g., a removable disk drive, a flash drive, etc.) and/or network interface device 1440. A network interface device, such as network interface device 1440, may be utilized for connecting computer system 1400 to one or more of a variety of networks, such as network 1444, and one or more remote devices 1448 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1444, may employ a wired and/or a wireless mode of communication. In general, any network topology may be used. Information (e.g., data, software 1420, etc.) may be communicated to and/or from computer system 1400 via network interface device 1440.

Computer system 1400 may further include a video display adapter 1452 for communicating a displayable image to a display device, such as display device 1436. Examples of a display device include, but are not limited to, a liquid crystal display (LCD), a cathode ray tube (CRT), a plasma display, a light emitting diode (LED) display, and any combinations thereof. Display adapter 1452 and display device 1436 may be utilized in combination with processor 1404 to provide graphical representations of aspects of the present disclosure. In addition to a display device, computer system 1400 may include one or more other peripheral output devices including, but not limited to, an audio speaker, a printer, and any combinations thereof. Such peripheral output devices may be connected to bus 1412 via a peripheral interface 1456. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for digitizing a slide, wherein the system comprises:
   an optical system comprising at least an optical sensor; and
   a computing device configured to:
      perform a scan of the slide by capturing at least a first image and capturing at least a second image, wherein performing the scan comprises:
         identifying a first scanning parameter;
         using the optical system, capturing the at least a first image at at least a first location, as a function of the first scanning parameter;
         using a localization module, identifying a region of interest as a function of the at least a first image;
         determining, using a localization module, a first quality metric as a function of the at least a first image, wherein the first quality metric comprises a localization module confidence score that quantifies a likelihood that a biological sample is present at at least a second location;
         determining, for the at least a second location, that the localization module confidence score does not exceed a predetermined threshold;
         identifying, using a biopsy plane estimation module, a plane at the at least a second location that includes a biological specimen as a function of the at least a second image;
         adjusting the region of interest to include the at least a second location as a function of the biopsy plane estimation module;
         mapping, in a map, a first value for the at least a first location as a function of the first quality metric;
         determining a second scanning parameter as a function of the first quality metric;
         using the optical system, capturing the at least a second image at the at least a second location, as a function of the second scanning parameter;
         determining a second quality metric as a function of the at least a second image; and
         mapping, in the map, a second value for the at least a second location as a function of the second quality metric.

2. The system of claim 1, wherein:
   the first quality metric comprises a focus sampling quality metric; and
   determining the second scanning parameter comprises identifying a focal setting at which a selected point is in focus as a function of the focus sampling quality metric.

3. The system of claim 1, wherein:
   the first quality metric comprises a z-stack acquisition quality metric; and
   determining the second scanning parameter comprises, using the optical system, capturing a z-stack at a selected point as a function of the z-stack acquisition quality metric.

4. The system of claim 1, wherein:
   the at least a first image comprises a macro image; and
   capturing the at least a second image comprises:
      using the optical system, capturing a first plurality of images; and
      combining the first plurality of images to create the at least a second image.

5. The system of claim 4, wherein performing the scan further comprises:
   determining a stitching quality metric as a function of the at least a second image;
   determining a third scanning parameter as a function of the stitching quality metric;
   using the optical system, capturing a second plurality of images as a function of the third scanning parameter; and
   combining the second plurality of images to create at least a third image.

6. The system of claim 1, wherein performing the scan further comprises capturing the at least a first image at a first location and capturing the at least a second image at a second location.

7. The system of claim 1, wherein performing the scan further comprises:
   determining a second quality metric as a function of the at least a first image;
   determining a combination quality metric as a function of the first quality metric and the second quality metric;
   determining a third scanning parameter as a function of the combination quality metric; and using the optical system, capturing at least a third image as a function of the third scanning parameter.

8. The system of claim 1, wherein performing the scan further comprises algorithmically removing a banding error from the at least a second image.

9. A method of digitizing a slide, wherein the method comprises:
using at least a processor, performing a scan of the slide by capturing at least a first image and capturing at least a second image, wherein performing the scan comprises:
identifying a first scanning parameter;
using an optical system, capturing the at least a first image at at least a first location as a function of the first scanning parameter;
using a localization module, identifying a region of interest as a function of the at least a first image;
determining, using a localization module, a first quality metric as a function of the at least a first image, wherein the first quality metric comprises a localization module confidence score that quantifies a likelihood that a biological sample is present at at least a second location;
determining, for the at least a second location, that the localization module confidence score does not exceed a predetermined threshold;
identifying, using a biopsy plane estimation module, a plane at the at least a second location that includes a biological specimen as a function of the at least a second image;
adjusting the region of interest to include the at least a second location as a function of the biopsy plane estimation module;
mapping, in a map, a first value for the at least a first location as a function of the first quality metric;
determining a second scanning parameter as a function of the first quality metric;
using the optical system, capturing the at least a second image at the at least a second location as a function of the second scanning parameter;
determining a second quality metric as a function of the at least a second image; and
mapping, in the map, a second value for the at least a second location as a function of the second quality metric.

10. The method of claim 9, wherein:
the first quality metric comprises a focus sampling quality metric; and
determining the second scanning parameter comprises identifying a focal setting at which a selected point is in focus as a function of the focus sampling quality metric.

11. The method of claim 9, wherein:
the first quality metric comprises a z-stack acquisition quality metric; and
determining the second scanning parameter comprises, using the optical system, capturing a z-stack at a selected point as a function of the z-stack acquisition quality metric.

12. The method of claim 9, wherein:
the at least a first image comprises a macro image; and
capturing the at least a second image comprises:
using the optical system, capturing a first plurality of images; and
combining the first plurality of images to create the at least a second image.

13. The method of claim 12, wherein performing the scan further comprises:
determining a stitching quality metric as a function of the at least a second image;
determining a third scanning parameter as a function of the stitching quality metric;
using the optical system, capturing a second plurality of images as a function of the third scanning parameter; and
combining the second plurality of images to create at least a third image.

14. The method of claim 9, wherein performing the scan further comprises capturing the at least a first image at a first location and capturing the at least a second image at a second location.

15. The method of claim 9, wherein performing the scan further comprises:
determining a second quality metric as a function of the at least a first image;
determining a combination quality metric as a function of the first quality metric and the second quality metric;
determining a third scanning parameter as a function of the combination quality metric; and
using the optical system, capturing at least a third image as a function of the third scanning parameter.

16. The method of claim 9, wherein performing the scan further comprises algorithmically removing a banding error from the at least a second image.

17. The system of claim 1, wherein performing the scan further comprises:
combining, using a stitching module, the at least a first image and the at least a second image to make at least a combined image;
determining a stitching quality metric as a function of the at least a combined image;
comparing the stitching quality metric with a stitching quality threshold;
capturing, using the optical system, at least a third image at at least a third location; and
selectively, as a function of the comparison between the stitching quality metric and the stitching quality threshold, either:
combine, using the stitching module, the at least a third image with the at least a combined image; or
after the scan is completed, perform a non-inline stitching process.

18. The method of claim 9, wherein performing the scan further comprises:
combining, using a stitching module, the at least a first image and the at least a second image to make at least a combined image;
determining a stitching quality metric as a function of the at least a combined image;
comparing the stitching quality metric with a stitching quality threshold;
capturing, using the optical system, at least a third image at at least a third location; and
selectively, as a function of the comparison between the stitching quality metric and the stitching quality threshold, either:
combine, using the stitching module, the at least a third image with the at least a combined image; or
after the scan is completed, perform a non-inline stitching process.

19. A system for digitizing a slide, wherein the system comprises:

an optical system comprising at least an optical sensor; and a computing device configured to:
perform a scan of the slide by capturing at least a first image and capturing at least a second image, wherein the first image comprises a macro image and wherein performing the scan comprises:
identifying a first scanning parameter;
using the optical system, capturing the at least a first image at at least a first location, as a function of the first scanning parameter;
using a localization module, identifying a region of interest as a function of the at least a first image;
determining a first quality metric as a function of the at least a first image;
mapping, in a map, a first value for the at least a first location as a function of the first quality metric;
determining a second scanning parameter as a function of the first quality metric;
using the optical system, capturing the at least a second image at the at least a second location, as a function of the second scanning parameter wherein capturing the at least a second image comprises:
using the optical system, capturing a first plurality of images; and
combining the first plurality of images to create the at least a second image;
determining a second quality metric as a function of the at least a second image;
mapping, in the map, a second value for the at least a second location as a function of the second quality metric;
determining a stitching quality metric as a function of the at least a second image;
determining a third scanning parameter as a function of the stitching quality metric;
using the optical system, capturing a second plurality of images as a function of the third scanning parameter; and
combining the second plurality of images to create at least a third image.

20. A system for digitizing a slide, wherein the system comprises:
an optical system comprising at least an optical sensor; and
a computing device configured to:
perform a scan of the slide by capturing at least a first image and capturing at least a second image, wherein performing the scan comprises:
identifying a first scanning parameter;
using the optical system, capturing the at least a first image at at least a first location, as a function of the first scanning parameter;
using a localization module, identifying a region of interest as a function of the at least a first image;
determining a first quality metric as a function of the at least a first image;
mapping, in a map, a first value for the at least a first location as a function of the first quality metric;
determining a second scanning parameter as a function of the first quality metric;
using the optical system, capturing the at least a second image at the at least a second location, as a function of the second scanning parameter;
determining a second quality metric as a function of the at least a second image;
mapping, in the map, a second value for the at least a second location as a function of the second quality metric;
determining a second quality metric as a function of the at least a first image;
determining a combination quality metric as a function of the first quality metric and the second quality metric;
determining a third scanning parameter as a function of the combination quality metric; and
using the optical system, capturing at least a third image as a function of the third scanning parameter.

21. A system for digitizing a slide, wherein the system comprises:
an optical system comprising at least an optical sensor; and
a computing device configured to:
perform a scan of the slide by capturing at least a first image and capturing at least a second image, wherein performing the scan comprises:
identifying a first scanning parameter;
using the optical system, capturing the at least a first image at at least a first location, as a function of the first scanning parameter;
using a localization module, identifying a region of interest as a function of the at least a first image;
determining a first quality metric as a function of the at least a first image;
mapping, in a map, a first value for the at least a first location as a function of the first quality metric;
determining a second scanning parameter as a function of the first quality metric;
using the optical system, capturing the at least a second image at the at least a second location, as a function of the second scanning parameter;
determining a second quality metric as a function of the at least a second image;
mapping, in the map, a second value for the at least a second location as a function of the second quality metric;
combining, using a stitching module, the at least a first image and the at least a second image to make at least a combined image;
determining a stitching quality metric as a function of the at least a combined image;
comparing the stitching quality metric with a stitching quality threshold;
capturing, using the optical system, at least a third image at at least a third location; and
selectively, as a function of the comparison between the stitching quality metric and the stitching quality threshold, either:
combine, using the stitching module, the at least a third image with the at least a combined image; or
after the scan is completed, perform a non-inline stitching process.

22. A method for digitizing a slide, wherein the method comprises:
using at least a processor, performing a scan of the slide by capturing at least a first image and capturing at least a second image wherein the first image comprises a macro image and wherein performing the scan comprises:
identifying a first scanning parameter;

using an optical system, capturing the at least a first image at at least a first location, as a function of the first scanning parameter;

using a localization module, identifying a region of interest as a function of the at least a first image;

determining a first quality metric as a function of the at least a first image;

mapping, in a map, a first value for the at least a first location as a function of the first quality metric;

determining a second scanning parameter as a function of the first quality metric;

using the optical system, capturing the at least a second image at the at least a second location, as a function of the second scanning parameter wherein capturing the at least a second image comprises:
- using the optical system, capturing a first plurality of images; and
- combining the first plurality of images to create the at least a second image;

determining a second quality metric as a function of the at least a second image;

mapping, in the map, a second value for the at least a second location as a function of the second quality metric;

determining a stitching quality metric as a function of the at least a second image;

determining a third scanning parameter as a function of the stitching quality metric;

using the optical system, capturing a second plurality of images as a function of the third scanning parameter; and combining the second plurality of images to create at least a third image.

23. A method for digitizing a slide, wherein the method comprises:

using at least a processor, performing a scan of the slide by capturing at least a first image and capturing at least a second image, wherein performing the scan comprises:
- identifying a first scanning parameter;
- using an optical system, capturing the at least a first image at at least a first location, as a function of the first scanning parameter;
- using a localization module, identifying a region of interest as a function of the at least a first image;
- determining a first quality metric as a function of the at least a first image;
- mapping, in a map, a first value for the at least a first location as a function of the first quality metric;
- determining a second scanning parameter as a function of the first quality metric;
- using the optical system, capturing the at least a second image at the at least a second location, as a function of the second scanning parameter;
- determining a second quality metric as a function of the at least a second image;
- mapping, in the map, a second value for the at least a second location as a function of the second quality metric;
- determining a second quality metric as a function of the at least a first image;
- determining a combination quality metric as a function of the first quality metric and the second quality metric;
- determining a third scanning parameter as a function of the combination quality metric; and
- using the optical system, capturing at least a third image as a function of the third scanning parameter.

24. A method for digitizing a slide, wherein the method comprises:

using at least a processor, performing a scan of the slide by capturing at least a first image and capturing at least a second image, wherein performing the scan comprises:
- identifying a first scanning parameter;
- using an optical system, capturing the at least a first image at at least a first location, as a function of the first scanning parameter;
- using a localization module, identifying a region of interest as a function of the at least a first image;
- determining a first quality metric as a function of the at least a first image;
- mapping, in a map, a first value for the at least a first location as a function of the first quality metric;
- determining a second scanning parameter as a function of the first quality metric;
- using the optical system, capturing the at least a second image at the at least a second location, as a function of the second scanning parameter;
- determining a second quality metric as a function of the at least a second image;
- mapping, in the map, a second value for the at least a second location as a function of the second quality metric;
- combining, using a stitching module, the at least a first image and the at least a second image to make at least a combined image;
- determining a stitching quality metric as a function of the at least a combined image;
- comparing the stitching quality metric with a stitching quality threshold;
- capturing, using the optical system, at least a third image at at least a third location; and
- selectively, as a function of the comparison between the stitching quality metric and the stitching quality threshold, either:
  - combine, using the stitching module, the at least a third image with the at least a combined image; or
  - after the scan is completed, perform a non-inline stitching process.

* * * * *